(12) United States Patent
Deng et al.

(10) Patent No.: US 12,248,865 B2
(45) Date of Patent: Mar. 11, 2025

(54) SYSTEMS AND METHODS FOR MODELING CONTINUOUS STOCHASTIC PROCESSES WITH DYNAMIC NORMALIZING FLOWS

(71) Applicant: ROYAL BANK OF CANADA, Toronto (CA)

(72) Inventors: Ruizhi Deng, Coquitlam (CA); Bo Chang, Toronto (CA); Marcus Anthony Brubaker, Toronto (CA); Gregory Peter Mori, Burnaby (CA); Andreas Steffen Michael Lehrmann, Vancouver (CA)

(73) Assignee: ROYAL BANK OF CANADA, Toronto (CA)

( * ) Notice: Subject to any disclaimer, the term of this patent is extended or adjusted under 35 U.S.C. 154(b) by 1008 days.

(21) Appl. No.: 17/170,416

(22) Filed: Feb. 8, 2021

(65) Prior Publication Data
US 2021/0256358 A1    Aug. 19, 2021

Related U.S. Application Data

(60) Provisional application No. 62/971,143, filed on Feb. 6, 2020.

(51) Int. Cl.
*G06N 3/047* (2023.01)
*G06N 3/08* (2023.01)

(52) U.S. Cl.
CPC .............. *G06N 3/047* (2023.01); *G06N 3/08* (2013.01)

(58) Field of Classification Search
CPC .......... G06N 3/047; G06N 3/08; G06N 3/045; G06N 3/044; G06N 3/0472
See application file for complete search history.

(56) References Cited

U.S. PATENT DOCUMENTS

| 11,100,586 B1 * | 8/2021 | Wang | H01L 27/1463 |
| 2018/0129968 A1 * | 5/2018 | Osogami | G06N 3/049 |
| 2019/0018933 A1 * | 1/2019 | Oono | G06N 3/045 |

OTHER PUBLICATIONS

Both et al., "Temporal Normalizing Flows" (Year: 2019).*
De Brouwer et al., "GRU-ODE-Bayes: Continuous modeling of sporadically-observed time series" (Year: 2019).*
D. Barber; Bayesian Reasoning and Machine Learning; Cambridge University Press, 2012.
(Continued)

*Primary Examiner* — Randall K. Baldwin
(74) *Attorney, Agent, or Firm* — NORTON ROSE FULBRIGHT CANADA LLP

(57) ABSTRACT

Systems and methods for machine learning architecture for time series data prediction. The system may include a processor and a memory storing processor-executable instructions. The processor-executable instructions, when executed, may configure the processor to: obtain time series data associated with a data query; generate a predicted value based on a sampled realization of the time series data and a continuous time generative model, the continuous time generative model trained to define an invertible mapping to maximize a log-likelihood of a set of predicted values for a time range associated with the time series data; and generate a signal providing an indication of the predicted value associated with the data query.

20 Claims, 19 Drawing Sheets

(56) References Cited

OTHER PUBLICATIONS

L. E. Baum and T. Petrie; Statistical Inference for Probabilistic Functions of Finite State Markov Chains; The Annals of Mathematical Statistics, vol. 37, No. 6, Institute of Mathematical Statistics, 1966, pp. 1554-1563.
J. Behrmann et al.; Invertible Residual Networks; Proceedings of the 36th International Conference on Machine Learning, PMLR 97, 2019.
S.R. Bowman et al.; Generating Sentences from a Continuous Space; Proceedings of the 20th SIGNLL Conference on Computational Natural Language Learning (CONLL), 2016.
Y. Burda et al.; Importance Weighted Autoencoders; Under review as a conference paper at ICLR 2016.
O. Cappé et al.; An Overview of Existing Methods and Recent Advances in Sequential Monte Carlo; Proceedings of the IEEE, vol. 95, No. 5, pp. 899-924, May 2007.
R.T.Q. Chen et al.; Neural Ordinary Differential Equations; 32nd Conference on Neural Information Processing Systems (NeurIPS 2018), Montreal, Canada.
R.T.Q. Chen et al.; Residual Flows for Invertible Generative Modeling; 33rd Conference on Neural Information Processing Systems (NeurIPS 2019), Vancouver, Canada.
K. Cho et al.; Learning Phrase Representations using RNN Encoder-Decoder for Statistical Machine Translation; Conference on Empirical Methods in Natural Language Processing (EMNLP 2014).
J. Chung et al.; A Recurrent Latent Variable Model for Sequential Data; Advances in Neural Information Processing Systems, Jan. 2015.
L. Dinh et al.; NICE: Non-Linear Independent Components Estimation; Accepted as a workshop contribution at ICLR 2015.
L. Dinh et al.; Density Estimation Using Real NVP; Published as a conference paper at ICLR 2017.
E. Dupont et al.; Augmented Neural ODEs; 33rd Conference on Neural Information Processing Systems (NeurIPS 2019), Vancouver, Canada.
J. Durbin and S.J. Koopman; Time Series Analysis by State Space Methods; Oxford University Press, 2012.
E.B. Fox et al.; Nonparametric Bayesian Learning of Switching Linear Dynamical Systems; Advances in Neural Information Processing Systems, Jan. 2008.
M. Fraccaro et al.; Sequential Neural Models with Stochastic Layers; 30th Conference on Neural Information Processing Systems (NIPS 2016), Barcelona, Spain.
M. Garnelo et al.; Conditional Neural Processes; Proceedings of the 35th International Conference on Machine earning, Stockholm, Sweden, PMLR 80, 2018.
M. Garnelo et al.; Neural Processes; Presented at the ICML 2018 workshop on Theoretical Foundations and Applications of Deep Generative Models.
W. Grathwohl et al.; Scalable Reversible Generative Models with Free-Form Continuous Dynamics; 1st Symposium on Advances in Approximate Bayesian Inference, 2018, pp. 1-14.
J. He et al.; Lagging Inference Networks and Posterior Collapse in Variational Autoencoders; Published as a conference paper at ICLR 2019.
M.F. Hutchinson; A Stochastic Estimator of the Trace of the Influence Matrix for Laplacian Smoothing Splines; Communications in Statistics—Simulation and Computation, 19(2):433-450, 1990.
K. Ito and K. Xiong; Gaussian Filters for Nonlinear Filtering Problems; IEEE Transactions on Automatic Control, vol. 45, No. 5, May 2000, pp. 910-927.

J.M. Wang et al.; Gaussian Process Dynamical Models for Human Motion; IEEE Transactions on Pattern Analysis and Machine Intelligence, vol. 30, No. 2, Feb. 2008, pp. 283-297.
S.J. Julier and J.K. Uhlmann; A New Extension of the Kalman Filter to Nonlinear Systems; In Aerospace/Defense Sensing, Simulation and Controls, 1997.
R.E. Kalman; A New Approach to Linear Filtering and Prediction Problems; Transactions of the ASME—Journal of Basic Engineering, 82 (Series D): 35-45, 1960.
H. Kim et al.; Attentive Neural Processes; Published as a conference paper at ICLR 2019.
D.P. Kingma and M. Welling; Auto-Encoding Variational Bayes; In International Conference on Learning Representations, 2014.
D.P. Kingma and P. Dhariwal; Glow: Generative Flow with Invertible 1x1 Convolutions; Advances in Neural Information Processing Systems 31 (NeurIPS 2018).
D.P. Kingma et al.; Improved Variational Inference with Inverse Autoregressive Flow; 30th Conference on Neural Information Processing Systems (NIPS 2016), Barcelona, Spain.
I. Kobyzev et al.; Normalizing Flows: An Introduction and Review of Current Methods; arXiv:1908.09257, 2019.
M. Kumar et al.; VideoFlow: A Conditional Flow-Based Model for Stochastic Video Generation; Published as a conference paper at ICLR 2020, 2019.
J.-F. Le Gall; Brownian Motion, Martingales, and Stochastic Calculus; Graduate Texts in Mathematics 274, Springer, 2016.
A.M. Lehrmann et al.; Efficient Nonlinear Markov Models for Human Motion; 2014 IEEE Conference on Computer Vision and Pattern Recognition, pp. 1314-1321.
X. Li et al.; Scalable Gradients for Stochastic Differential Equations; Proceedings of the 23rd International Conference on Artificial Intelligence and Statistics (AISTATS) 2020, Palermo, Italy, PMLR: vol. 108.
R. Luo et al.; A Neural Stochastic Volatility Model; Association for the Advancement of Artificial Intelligence, 2018.
N. Mehrasa et al.; Point Process Flows; arXiv:1910.08281v3 [cs.LG] Dec. 22, 2019.
G. Papamakarios et al.; Masked Autoregressive Flow for Density Estimation; arXiv:1705.07057v4 [stat.ML] Jun. 14, 2018.
G. Papamakarios et al.; Normalizing Flows for Probabilistic Modeling and Inference; arXiv:1912.02762v1 [stat.ML] Dec. 5, 2019.
S.Qin et al.; Recurrent Attentive Neural Process for Sequential Data; arXiv:1910.09323v1 [cs.LG] Oct. 17, 2019.
C.E. Rasmussen and C.K.I. Williams; Gaussian Processes for Machine Learning; MIT (Massachusetts Institute of Technology) Press, 2006.
D. Rezende and S. Mohamed; Variational Inference with Normalizing Flows; Proceedings of the 32nd International Conference on Machine Learning, Lille, France, 2015; JMLR: W&CP vol. 37.
Y. Rubanova et al.; Latent ODEs for Irregularly-Sampled Time Series; 33rd Conference on Neural Information Processing Systems (NeurIPS 2019), Vancouver, Canada.
O. Shchur et al.; Intensity-Free Learning of Temporal Point Processes; Published as a conference paper at ICLR 2020.
G. Singh et al.; Sequential Neural Processes; 33rd Conference on Neural Information Processing Systems (NeurIPS 2019), Vancouver, Canada.
S. Särkkä; On Unscented Kalman Filtering for State Estimation of Continuous-Time Nonlinear Systems; IEEE Transactions on Automatic Control, vol. 52, No. 9, Sep. 2007, pp. 1631-1641.
Y. Tassa et al.; DeepMind Control Suite; arXiv:1801.00690v1 [cs.AI] Jan. 2, 2018.
S. Zhang et al.; Cautionary Tales on Air-Quality Improvement in Beijing; Proc. R. Soc. A 473: 20170457 http:/dx.doi.org/10.1098/rspa.2017.0457.
O. Cappé et al.; Hidden Markov Models and Dynamical System, Chapter 4, Continuous States and Observations and Kalman Filtering, Springer, 2005.

\* cited by examiner

| Model | GBM | | OU | | M-OU |
| --- | --- | --- | --- | --- | --- |
| | $\lambda_{test}=2$ | $\lambda_{test}=20$ | $\lambda_{test}=2$ | $\lambda_{test}=20$ | $\lambda_{test}=(2,20)$ |
| Latent ODE [44] | 3.826 | 5.935 | 3.066 | 3.027 | 2.690 |
| VRNN [12] | 3.762 | 3.492 | 2.729 | 1.939 | 1.415 |
| CTFP (ours) | 3.107 | 1.929 | 2.902 | 1.941 | 1.408 |
| Latent CTFP (ours) | 3.107 | 1.930 | 2.902 | 1.939 | 1.392 |
| Ground Truth | 3.106 | 1.928 | 2.722 | 1.888 | 1.379 |

FIG. 4

| Model | Mujoco-Hopper [44] | BAQD [4] | PTBDB [49] |
|---|---|---|---|
| Latent ODE [44] | 24.775 ± 0.010 | 2.789 ± 0.011 | −0.818 ± 0.009 |
| VRNN [12] | 9.113 ± 0.018 | 0.604 ± 0.007 | −1.999 ± 0.008 |
| CTFP (ours) | −16.249 ± 0.034 | −2.361 ± 0.020 | −1.324 ± 0.028 |
| Latent CTFP (ours) | −31.397 ± 0.063 | −6.894 ± 0.046 | −1.999 ± 0.010 |

FIG. 6

Table 3: Ablation Study on Time Interval for Real-World Data

| Model | Negative Log-Likelihood | | | | | |
| --- | --- | --- | --- | --- | --- | --- |
| | Mujoco-Hopper | | BAQD | | PTBDB | |
| | $\lambda_{test}=1$ | $\lambda_{test}=5$ | $\lambda_{test}=1$ | $\lambda_{test}=5$ | $\lambda_{test}=1$ | $\lambda_{test}=5$ |
| Latent ODE | $25.082\pm0.011$ | $24.599\pm0.004$ | $2.948\pm0.006$ | $2.686\pm0.006$ | $-0.633\pm0.006$ | $-0.802\pm0.009$ |
| VRNN | $10.553\pm0.010$ | $8.543\pm0.008$ | $0.044\pm0.007$ | $-1.016\pm0.001$ | $-1.552\pm0.011$ | $-2.545\pm0.005$ |
| CTFP | $-10.152\pm0.084$ | $-23.241\pm0.057$ | $-1.255\pm0.022$ | $-3.784\pm0.035$ | $-1.028\pm0.028$ | $-1.824\pm0.014$ |
| Latent CTFP | $-30.469\pm0.079$ | $-33.412\pm0.035$ | $-7.276\pm0.061$ | $-6.226\pm0.016$ | $-1.552\pm0.010$ | $-2.533\pm0.008$ |

FIG. 7

| Model | GBM | | OU | | M-OU |
|---|---|---|---|---|---|
| | $\lambda_{test} = 2$ | $\lambda_{test} = 20$ | $\lambda_{test} = 2$ | $\lambda_{test} = 20$ | $\lambda_{test} = (2, 20)$ |
| Latent ODE [44] | 3.826 | 5.935 | 3.066 | 3.027 | 2.690 |
| CTFP-IID-Gaussian | 4.952 | 4.094 | 3.025 | 3.024 | 2.716 |
| Latent CTFP-IID-Gaussian | 3.945 | 5.072 | 3.017 | 3.000 | 2.689 |
| CTFP (ours) | 3.107 | 1.929 | 2.902 | 1.941 | 1.408 |
| Latent CTFP (ours) | 3.107 | 1.930 | 2.902 | 1.939 | 1.392 |
| Ground Truth | 3.106 | 1.928 | 2.722 | 1.888 | 1.379 |

FIG. 8

| Model | Mujoco-Hopper [44] | BAQD [4] | PTBDB [49] |
|---|---|---|---|
| Latent ODE [44] | 24.775 ± 0.010 | 2.789 ± 0.011 | −0.818 ± 0.009 |
| CTFP-IID-Gaussian | 22.023 ± 0.010 | 3.398 ± 0.006 | −0.375 ± 0.003 |
| Latent CTFP-IID-Gaussian | 17.397 ± 0.007 | 1.471 ± 0.005 | −1.436 ± 0.005 |
| CTFP (ours) | −16.249 ± 0.034 | −2.361 ± 0.020 | −1.324 ± 0.028 |
| Latent CTFP (ours) | −31.397 ± 0.063 | −6.894 ± 0.046 | −1.999 ± 0.010 |

FIG. 9

| Model | NLL |
|---|---|
| Latent ODE (original) | $4 \times 10^7 \pm 9 \times 10^5$ |
| Latent ODE (V1) | $45.874 \pm 0.001$ |
| Latent ODE (V2) | $24.775 \pm 0.010$ |
| VRNN | $9.113 \pm 0.018$ |
| CTFP | $-16.249 \pm 0.034$ |
| Latent CTFP | $\mathbf{-31.397 \pm 0.063}$ |

FIG. 11

SYSTEMS AND METHODS FOR MODELING CONTINUOUS STOCHASTIC PROCESSES WITH DYNAMIC NORMALIZING FLOWS

FIELD

Embodiments of the present disclosure relate to the field of machine learning, and in particular to machine learning architecture for time series data prediction.

BACKGROUND

Stochastic processes may include a collection of random variables that are indexed by time. An example of a continuous stochastic process may be the Weiner process. Normalizing flows may include operations for transforming a base distribution into a complex target distribution, thereby providing models for data generation or probability density estimation. Expressive models for sequential data can contribute to a statistical basis for data prediction or generation tasks in a wide range of applications, including computer vision, robotics, financial technology, among other examples.

SUMMARY

Embodiments of the present disclosure may provide generative models for continuous stochastic processes. In particular, models provided herein may model continuous and irregular time series data based on reversible generative models. In some embodiments, the generative models may include operations for decoding a base continuous stochastic process (e.g., Weiner process) into a complex observable process using a dynamic instance of normalizing flows, such that resulting observable processes may be continuous in time. In addition to maintaining desirable properties of static normalizing flows (e.g., sampling or likelihood determination), embodiments of the present disclosure may include operations for inference tasks, such as interpolation and extrapolation at arbitrary time stamps, which may otherwise not be possible for some example time series data sets having complex or multivariate dynamics.

Embodiments of the present disclosure may be applicable to natural processes such as environmental conditions (e.g., temperature of a room throughout a day, wind speed over a period of time), speed of a travelling vehicle over time, electricity consumption over a period of time, valuation of assets in the capital markets, among other examples. Embodiments of the present disclosure may be applied to other applications such as natural language processing, recommendation systems, traffic pattern prediction, medical data analysis, forecasting, among other examples which may be associated with irregular time series data. The continuous time generative models disclosed herein may be configured for operations associated with weather forecasting, pedestrian behavior prediction by autonomous or self-driving vehicles, or healthcare data interpolation or prediction.

In one aspect, the present disclosure may provide a system for machine learning architecture for time series data prediction. The system may include: a processor and a memory coupled to the processor and storing processor-executable instructions. The processor-executable instructions that, when executed, may configure the processor to: obtain time series data associated with a data query; generate a predicted value based on a sampled realization of the time series data and a continuous time generative model, the continuous time generative model trained to define an invertible mapping to maximize a log-likelihood of a set of predicted observation values for a time range associated with the time series data; and generate a signal providing an indication of the predicted observation value associated with the data query.

In another aspect, the present disclosure may provide a method for machine learning architecture for time series data prediction. The method may include: obtaining time series data associated with a data query; generating a predicted value based on a sampled realization of the time series data and a continuous time generative model, the continuous time generative model trained to define an invertible mapping to maximize a log-likelihood of a set of predicted values for a time range associated with the time series data; and generating a signal providing an indication of the predicted value associated with the data query.

In another aspect, the present disclosure may provide a non-transitory computer-readable medium having stored thereon machine interpretable instructions or data representing a continuous time generative model trained to define an invertible mapping based on maximizing a log-likelihood of observation values of irregular time series data. The continuous time generative model may be configured to generate a predicted value based on a sampled realization of the time series data associated with a data query.

In one aspect, the present disclosure may provide a non-transitory computer-readable medium or media having stored thereon machine interpretable instructions which, when executed by a processor may cause the processor to perform one or more methods described herein.

In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the present disclosure.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures:

FIG. 4 illustrates a table of quantitative evaluation results based on the synthetic datasets described in the present disclosure;

FIG. 6 illustrates a table 600 of quantitative evaluation results based on the real-world data described in the present disclosure;

FIG. 7 illustrates a table showing experiment results based on the real-world data described in the present disclosure;

FIGS. 8 and 9 illustrate tables showing results of experiments described in the present disclosure;

FIG. 11 illustrates a table showing a comparison of different version of latent ODE models on Mujoco-Hopper datasets;

DETAILED DESCRIPTION

Figure 1:
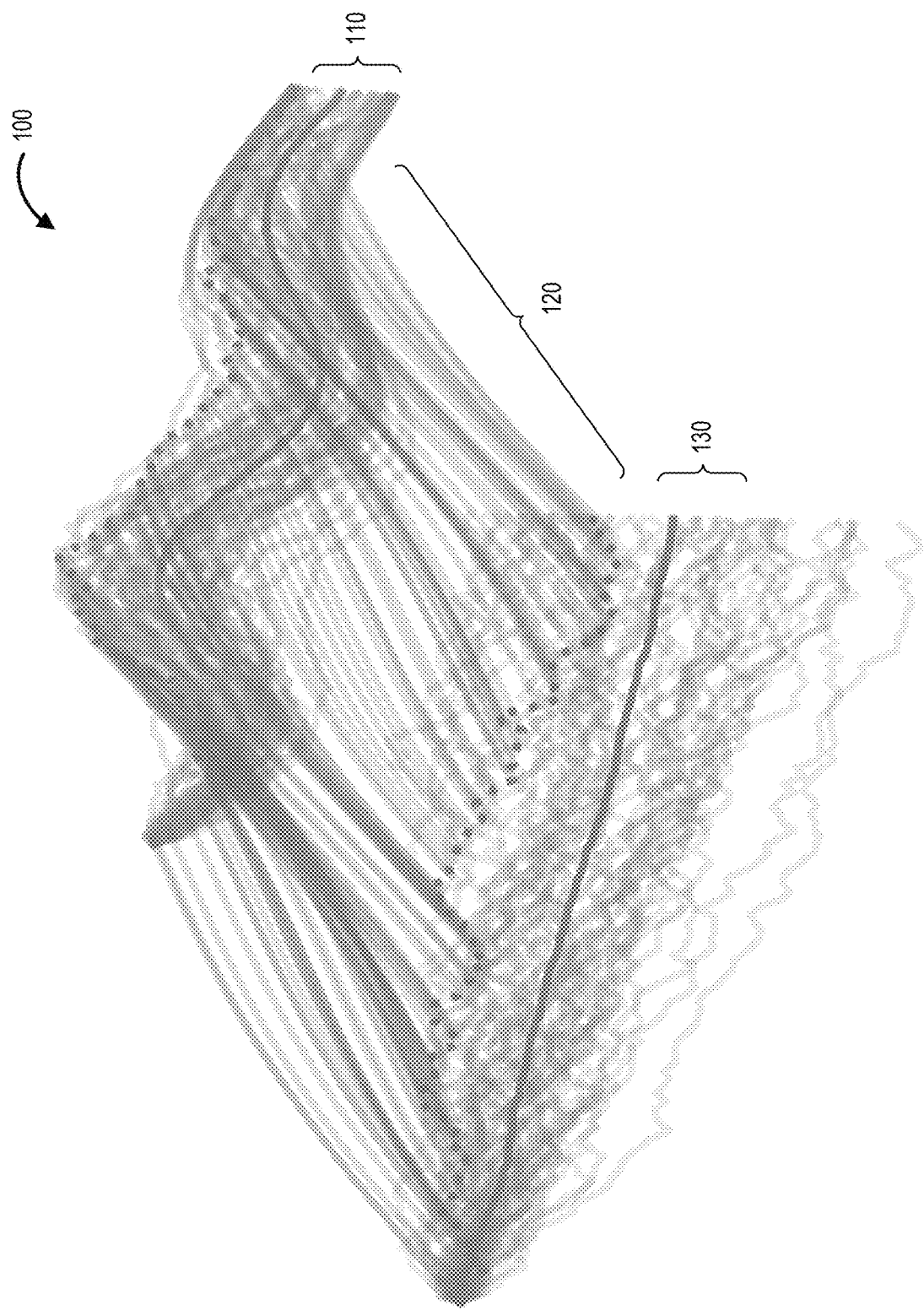
FIG. 1 is an illustration of a generative model decoding a base continuous process into a complex observable process based on a dynamic instance of normalizing flows, in accordance with embodiments of the present disclosure.

Embodiments of the present disclosure may be may be applicable to natural processes such as environmental conditions (e.g., temperature of a room throughout a day, wind speed over a period of time), speed of a travelling vehicle over time, electricity consumption over a period of time, valuation of assets in the capital markets, among other examples.

In practice, such example natural processes may be continuous processes having data sets generated based on discrete data sampling, which may occur at arbitrary points in time (e.g., arbitrarily obtained timestamped data). Modelling such natural processes may include inherent properties based on previous points in time, which may result in a potentially unmanageable matrix of variable or data dependencies. In some scenarios, such natural processes may be modeled with simple stochastic process such as the Weiner process, which may have the Markov property (e.g., memoryless property of the stochastic process). However, it may be beneficial to provide generative models that may be more expressive than such simple stochastic processes.

It may be beneficial provide generative models for such example processes to address some of the above-suggested challenges, such that example natural processes associated with a plurality of discrete samples may be represented by a generative model for generating continuous sampled data, likelihood approximation, or inferences (e.g., interpolation/extrapolation) at any point in time. As will be disclosed herein, in addition to extending the example Weiner process to a continuous time generative process, embodiments of generative models may be applicable to other continuous stochastic processes.

The present disclosure provides generative models for continuous stochastic processes. In particular, embodiments of the present disclosure may model continuous and irregular time series data based on reversible generative models for stochastic processes. Embodiments of a generative model (e.g., continuous-time flow process) may include operations for decoding a base continuous stochastic process (e.g., Weiner process) into a complex observable process using a dynamic instance of normalizing flows. Resulting observable processes may be continuous in time. In addition to maintaining desirable properties of static normalizing flow operations (e.g., efficient sampling and likelihood determination), embodiments of the present disclosure may include operations for inference tasks, such as interpolation and extrapolation at arbitrary time stamps, which may otherwise not be possible with some example time series data sets having complex or multivariate dynamics.

Expressive models for sequential data may provide a statistical basis for downstream tasks in a wide range of domains, including computer vision, robotics, finance or the like. Deep generative architectures, for example the concept of reversibility, may address limitations associated with structured decompositions (e.g., state-space models).

In some scenarios, utility of a time series model may be based on one or more of the following properties. First, with respect to resolution, example time series models may be discrete with respect to time. Such models may make an implicit assumption of a uniformly spaced temporal grid, which precludes its application from asynchronous tasks with a separate arrival process. Second, with respect to structural assumptions, expressiveness of a temporal model may be determined by the dependencies and shapes of its variables. In particular, the topological structure may be detailed to capture dynamics of the underlying process but sparse enough to allow for robust learning and efficient inference. Third, with respect to generation, a beneficial time series model should be able to generate unbiased samples from the true underlying process in an efficient way. Fourth, with respect to inference, given a trained model, the model may support standard inference tasks, such as interpolation, forecasting, and likelihood calculation.

Deep generative modeling may enable increased flexibility while keeping generation and inference tractable, based on example operations such as amortized variational inference [29, 12], reversible generative models [43, 30], and networks based on differential equations [10, 36].

In some embodiments disclosed herein, operations for modeling of continuous and irregular time series with a reversible generative model for stochastic processes are provided. In some embodiments, operations are based on features of normalizing flows. However, instead of a static base distribution, operations of models disclosed herein may transform a dynamic base process into an observable one. For example, operations of a continuous-time flow process (CTFP) may be a type of generative model that decodes the base continuous Wiener process into a complex observable process using a dynamic instance of normalizing flows. A resulting observable process may be continuous in time. In addition to appealing features of static normalizing flows (e.g., efficient sampling and exact likelihood), operations disclosed herein may also enable a series of inference tasks that may be typically unattainable in time series models with complex dynamics, such as interpolation and extrapolation at arbitrary timestamps. Furthermore, to overcome simple covariance structure of the Wiener process, embodiments disclosed herein may augment a reversible mapping with latent variables and optimize this latent CTFP variant using variational optimization.

Reference is made to FIG. 1, which is an illustration 100 of a generative model decoding a base continuous process into a complex observable process based on a dynamic instance of normalizing flows, in accordance with embodiments of the present disclosure.

For example, a Wiener process may be a continuous stochastic process. In some embodiments, operations may be configured for learning a complex observed process (generally illustrated and identified as reference numeral 110) through a differential deformation (generally illustrated and identified as reference numeral 120) of the base Wiener process (generally illustrated and identified as reference numeral 130), thereby preserving beneficial features of the base Wiener process.

In some embodiments, a continuous-time flow process (CTFP) may be a generative model for continuous stochastic processes. The continuous-time flow process may include one or more of the following properties: (1) provides flexible and consistent joint distributions on arbitrary and irregular time grids, with easy-to-compute density and an efficient sampling procedure; (2) the stochastic process generated by CTFP may provide continuous sample paths, promoting a natural fit for data with continuously-changing dynamics; or (3) CTFP may include operations for interpolation and extrapolation conditioned on given observations. As will be disclosed herein, operations of CTFP and embodiments of a latent variant may be tested based on one or more stochastic processes and real-world data sets, including the variational recurrent neural network (VRNN) [12] and latent ordinary differential equation (latent ODE) [44], and may illustrate beneficial properties.

Among the example traditional time series models are latent variable models following the state-space equations [16], including the variants with discrete and linear state-space [2, 27]. In non-linear examples, exact inference may be intractable and resort to approximate techniques [26, 24, 8, 7, 45] may be considered.

Embodiments of CTFP disclosed herein may be viewed as a form of a continuous-time extended Kalman filter where the nonlinear observation process is noiseless and invertible and the temporal dynamics are a Wiener process. Embodiments disclosed herein may be more expressive than a Wiener process but may retain one or more appealing properties of the Wiener process. Such appealing properties may include closed-form likelihood, interpolation, or extrapolation.

Tree-based variants of non-linear Markov models may be provided [34]. An augmentation with switching states may increase the expressiveness of state-space models; however, there may be challenges for learning [17] and inference [1]. Marginalization over an expansion of the state-space equations in terms of non-linear basis functions extends classical Gaussian processes [42] to Gaussian process dynamical models [25].

Based on application to image data, in some examples, operations may extend example variational autoencoder (VAE) [29] to sequential data [5, 12, 18, 37]. While RN N-based variational sequence models [12, 5] may model distributions over irregular timestamps, such timestamps have to be discrete. Such models may lack the notion of continuity. Accordingly, such models may not be suitable for modeling sequential data that have continuous underlying dynamics. Furthermore, such models may not be used to provide straightforward interpolation at arbitrary timestamps.

Latent ODEs [44] may utilize an ODE-RNN as encoder and may conduct operations to propagate a latent variable along a time interval using a neural ODE. Such operations may may ensure that the latent trajectory is continuous in time. However, decoding of the latent variables to observations may be done at each time step independently. In such examples, there may be no guarantee that sample paths are continuous, which may represent undesirable features similar to those observed with variational sequence models. Neural stochastic differential equations (neural SDEs) [36] may replace the deterministic latent trajectory of a latent ODE with a latent stochastic process; however, such examples may not not generate continuous sample paths.

In some examples [41], a recurrent neural process model may be provided. However, examples of the neural process family [28, 19, 20, 47] may simply model the conditional distribution of data given observations and may not provide generic generative models.

In some examples [33, 38, 46], models may include features of reversible generative models to sequential data, and thus may capture complex distributions. In some examples [38] and [46], models may include normalizing flows for modeling the distribution of inter-arrival time between events in temporal point processes. In some examples [33], models may include operations to generate video frames based on conditional normalizing flows. However, these models may use normalizing flows to model probability distributions in real space. In contrast, some embodiments described in the present disclosure may extend the domain of normalizing flows from distributions in real space to continuous-time stochastic processes.

In some embodiments disclosed herein, models may be based on stochastic processes and recent advances in normalizing flow research. A stochastic process may be defined as a collection of random variables indexed by time. An example of a continuous stochastic process may be the Wiener process.

The d-dimensional Wiener process $W_\tau$ may be characterized by the following properties: (1) $W_0=0$; (2) $W_t-W_s \sim \mathcal{N}(0, (t-s)I_d)$ for $s \leq t$, and $W_t-W_s$ may be independent of past values of $W_{s'}$ for all $s' \leq s$. The joint density of $(W_{\tau_1}, \ldots, W_{\tau_n})$ may be provided as the product of the conditional densities:

$$p_{(W_{\tau_1},\ldots,W_{\tau_n})}(w_{\tau_1}, \ldots, w_{\tau_n}) = \prod_{i=1}^{n} p_{W_{\tau_i}|W_{\tau_{i-1}}}(w_{\tau_i}|w_{\tau_{i-1}}) \text{ for } 0 \leq \tau_1 < \ldots < \tau_n \leq T.$$

The conditional distribution of $p_{w_t|w_s}$, for $s<t$, may be multivariate Gaussian; its conditional density may be:

$$p_{w_t|w_s}(w_t|w_s) = \mathcal{N}(w_t; w_s, (t-s)I_d), \tag{1}$$

where $I_d$ is a d-dimensional identity matrix. This equation may provide a way to sample from $(W_{\tau_1}, \ldots, W_{\tau_n})$. Furthermore, given $W_{t_1}=w_{t_1}$ and $W_{t_2}=w_{t_2}$ the conditional distribution of $W_t$ for $t_1 \leq t \leq t_2$ may also be Gaussian:

$$p_{w_t|w_{t_1}, w_{t_2}}(w_t|w_{t_1}, w_{t_2}) = \tag{2}$$

-continued $$\mathcal{N}\left(w_t; w_{t_1} + \frac{t-t_1}{t_2-t_1}(w_{t_2} - w_{t_1}), \frac{(t_2-t)(t-t_1)}{t_2-t_1}I_d\right).$$

The above may be known as the Brownian bridge. A property of the Wiener process is that the sample paths are continuous in time with probability one. This property may allow some embodiments of models disclosed herein to generate continuous sample paths and perform interpolation and extrapolation tasks.

Normalizing flows [43, 13, 31, 14, 40, 30, 3, 9, 32, 39] may be reversible generative models allowing density estimation and sampling. In some scenarios, it may be beneficial to estimate the density function $p_x$ of a random vector $X \in \mathbb{R}^d$, then normalizing flows assume $X=f(Z)$, where $f:\mathbb{R}^d \to \mathbb{R}^d$ is a bijective function, and $Z \in \mathbb{R}^d$ is a random vector with a simple density function $p_z$. The probability density function may be evaluated using the change of variables relation:

$$\log p_x(x) = \log p_z(g(x)) + \log \left|\det\left(\frac{\partial g}{\partial x}\right)\right|, \quad (3)$$

where we denote the inverse of $f$ by $g$ and $\partial g/\partial x$ is the Jacobian matrix of g. Sampling from $p_X$ may be conducted by drawing a sample from the simple distribution $z \sim p_Z$, and then conducting operations of the bijection $x=f(z)$.

In some examples [10, 21], models may include the continuous normalizing flow, which include operations of the neural ordinary differential equation (neural ODE) to model a flexible bijective mapping. Given $z=h(t_0)$ sampled from the base distribution $p_Z$, it may be mapped to $h(t_1)$ based on the mapping defined by the ODE: $dh(t)/dt=f(h(t), t)$. The change in log-density may be computed by the instantaneous change of variables formula [10]:

$$\log p_x(h(t_1)) = \log p_z(h(t_0)) - \int_{t_0}^{t_1} tr\left(\frac{\partial f}{\partial h(t)}\right)dt. \quad (4)$$

In some scenarios, a potential disadvantage of the neural ODE model is that it may preserve the topology of the input space, and there are classes of functions that may not be represented by neural ODEs. Some example models [15] include the augmented neural ODE (ANODE) model to address this limitation. The original formulation of ANODE may not a generative model and it may not support the computation of likelihoods $p_X(x)$ or sampling from the target distribution $x \sim p_X$. In some embodiments disclosed herein, operations may provide a modified version of ANODE that may be used as a conditional generative model.

Figure 2:
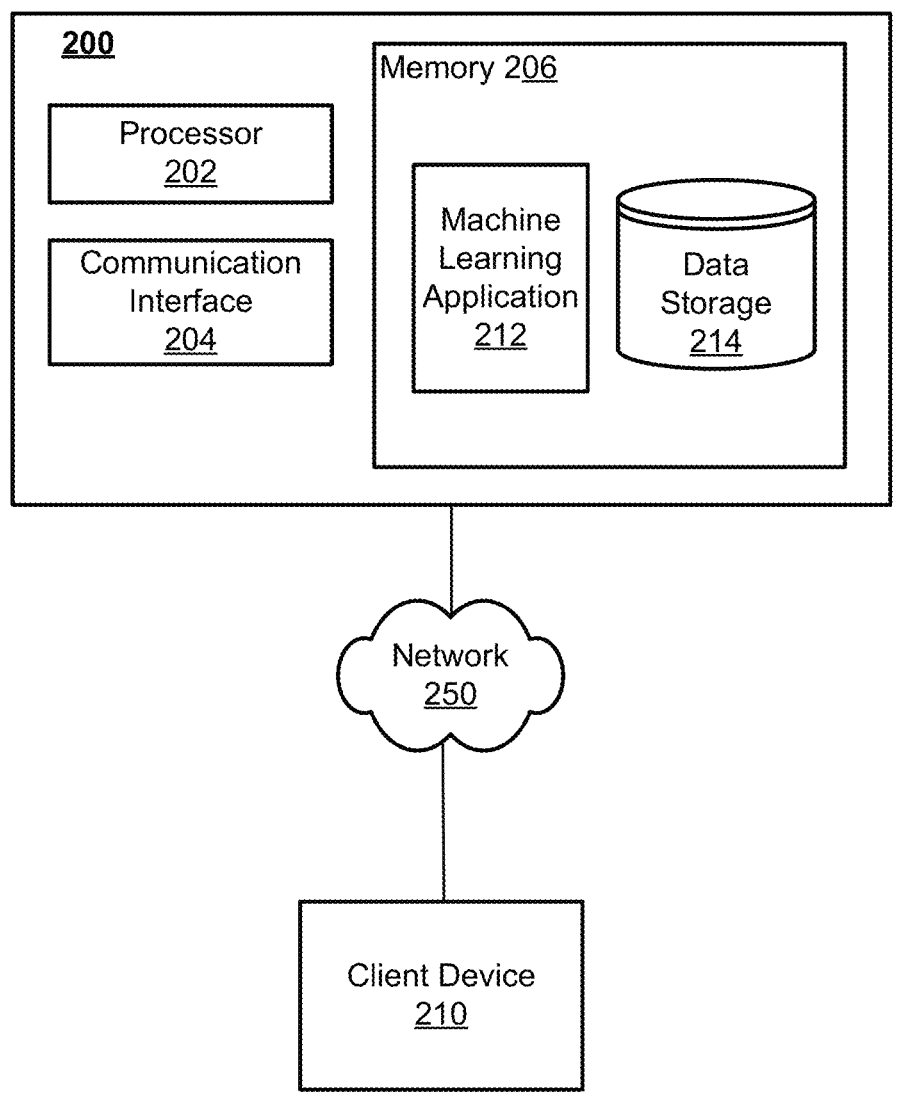
FIG. 2 illustrates a system for machine learning architecture, in accordance with an embodiment of the present disclosure.

Reference is made to FIG. 2, which illustrates a system for machine learning architecture, in accordance with an embodiment of the present disclosure. The system 200 may transmit and/or receive data messages to/from a client device 210 via a network 250. The network 250 may include a wired or wireless wide area network (WAN), local area network (LAN), a combination thereof, or the like.

The system 200 includes a processor 202 configured to execute processor-readable instructions that, when executed, configure the processor 202 to conduct operations described herein. For example, the system 200 may be configured to conduct operations for time series data prediction based on a continuous time generative model, in accordance with embodiments of the present disclosure.

The processor 202 may be a microprocessor or microcontroller, a digital signal processing (DSP) processor, an integrated circuit, a field programmable gate array (FPGA), a reconfigurable processor, a programmable read-only memory (PROM), or combinations thereof.

The system 200 includes a communication interface 204 to communicate with other computing devices, to access or connect to network resources, or to perform other computing applications by connecting to a network (or multiple networks) capable of carrying data. In some embodiments, the network 250 may include the Internet, Ethernet, plain old telephone service line, public switch telephone network, integrated services digital network, digital subscriber line, coaxial cable, fiber optics, satellite, mobile, wireless, SS7 signaling network, fixed line, local area network, wide area network, and others, including combination of these. In some examples, the communication interface 204 may include one or more busses, interconnects, wires, circuits, and/or any other connection and/or control circuit, or combination thereof. The communication interface 204 may provide an interface for communicating data between components of a single device or circuit.

The system may include memory 206. The memory 206 may include one or a combination of computer memory, such as static random-access memory, random-access memory, read-only memory, electro-optical memory, magneto-optical memory, erasable programmable read-only memory, electrically-erasable programmable read-only memory, Ferroelectric RAM or the like.

The memory 206 may store a machine learning application 212 including processor readable instructions for conducting operations described herein. In some embodiments, the machine application 212 may include operations for time series data prediction based on a continuous time generative model. Other example operations may be contemplated and are disclosed herein.

The system 200 may include a data storage 214. In some embodiments, the data storage 214 may be a secure data store. In some embodiments, the data storage 214 may store input data sets, such as image data, training data sets, or the like.

The client device 210 may be a computing device including a processor, memory, and a communication interface. In some embodiments, the client device 210 may be a computing device associated with a local area network. The client device 210 may be connected to the local area network and may transmit one or more data sets, via the network 250, to the system 200. The one or more data sets may be input data, such that the system 200 may conduct one or more operations associated with likelihood determination, data sampling, data interpolation, or data extrapolation. Other operations may be contemplated, as described in the present disclosure.

In some embodiments, the system may include a machine learning architecture having operations of a continuous-time flow process (CTFP). In some embodiments to be disclosed, a generative variant of ANODE may be provided as a component to implement operations of CTFP.

Embodiments may include a continuous-time flow process (CTFP). A generative variant of ANODE will be disclosed as a component to implement CTFP. In some scenarios, as a stochastic process may be continuous in time, embodiments of operations herein may provide interpolation and extrapolation at arbitrary time points. Further, in some embodiments, operations of a latent CTFP model may provide richer covariance structures.

In some embodiments, the machine learning architecture for continuous-time flow processes may provide that $\{(x_{\tau_i}, \tau_i)\}_{i=1}^n$, denotes a sequence of irregularly spaced time series data. The time series may be an incomplete realization of a continuous stochastic process $\{X_\tau\}_{\tau \in [0,T]}$. In particular, this stochastic process may induce a joint distribution of $(X_{\tau_1}, \ldots, X_{\tau_n})$. In some scenarios, it may be beneficial to model $\{X_\tau\}_{\tau \in [0,T]}$ such that the log-likelihood of the observations $$\mathcal{L} = \log p_{x_{\tau_1}, \ldots, x_{\tau_n}}(x_{\tau_1}, \ldots, x_{\tau_n}) \tag{5}$$

is maximized. In some embodiments, the continuous-time flow process (CTFP) $\{F_\theta(W_\tau;\tau)\}_{\tau \in [0,T]}$ may be defined such that $$X_\tau = F_\theta(W_\tau;\tau), \forall \tau \in [0,T], \tag{6}$$

where $F_\theta(\bullet;\tau):\mathbb{R}^d \to \mathbb{R}^d$ is an invertible mapping parametrized by the learnable parameters $\theta$ for every $\tau \in [0, T]$, and $W_\tau$ is a d-dimensional Wiener process.

In some embodiments, the log-likelihood in Equation 5 may be rewritten using the change of variables formula. For example, let $w_{\tau_i} = F_\theta^{-1}(x_{\tau_i}; \tau_i)$, then $$\mathcal{L} = \sum_{i=1}^n \left[ \log p_{w_{\tau_i}|w_{\tau_{i-1}}}(w_{\tau_i}|w_{\tau_{i-1}}) - \log\left|\det\frac{\partial F_\theta(w_{\tau_i};\tau_i)}{\partial w_{\tau_i}}\right|\right], \tag{7}$$

where $\tau_0 = 0$, $W_0 = 0$, and $$p_{w_{\tau_i}|w_{\tau_{i-1}}}$$

is described above.

Figure 3A:
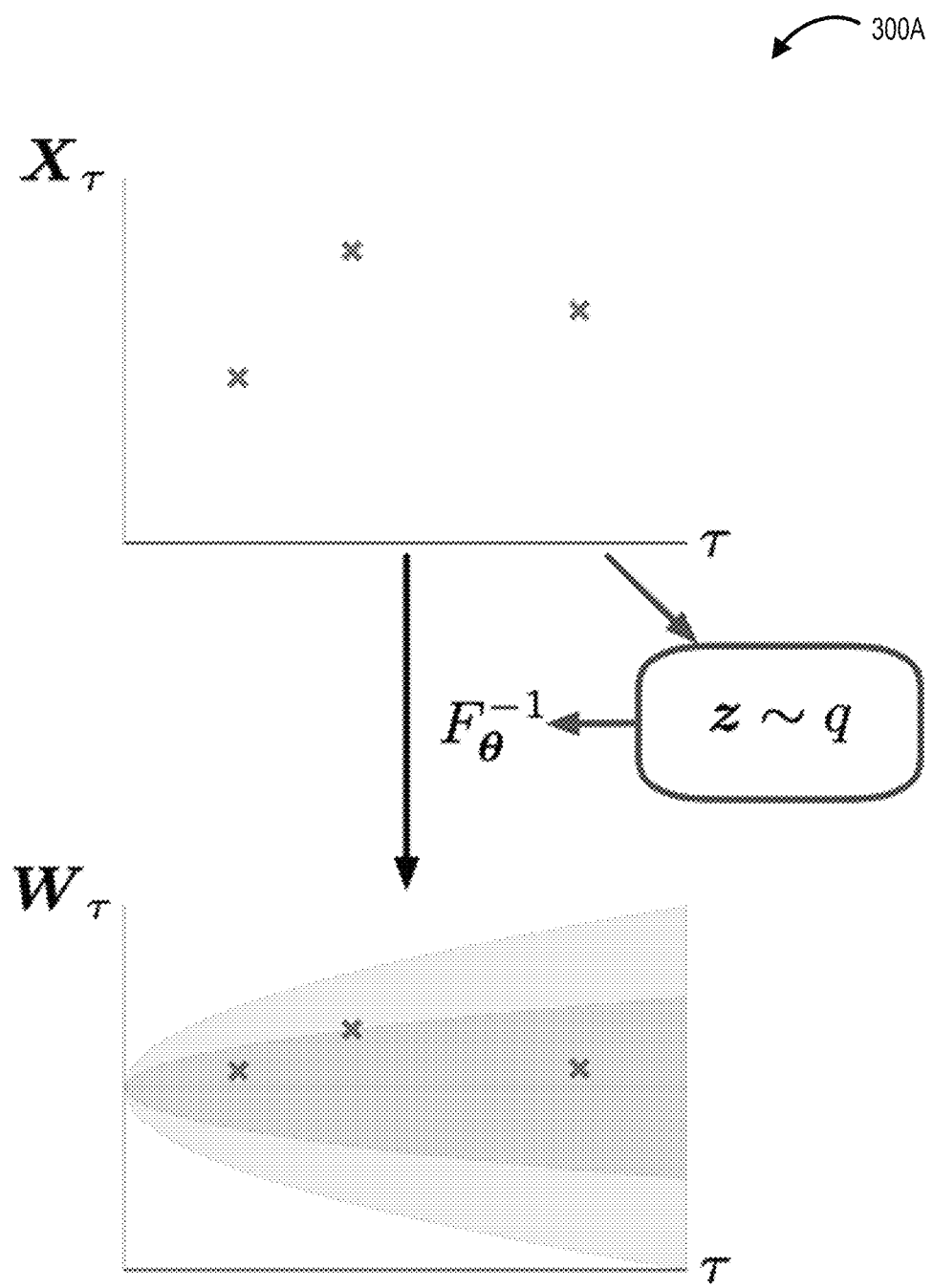
FIGS. 3A, 3B, and 3C illustrate features of embodiments of the continuous-time flow process operations, in accordance with embodiments of the present disclosure.
Figure 3B:
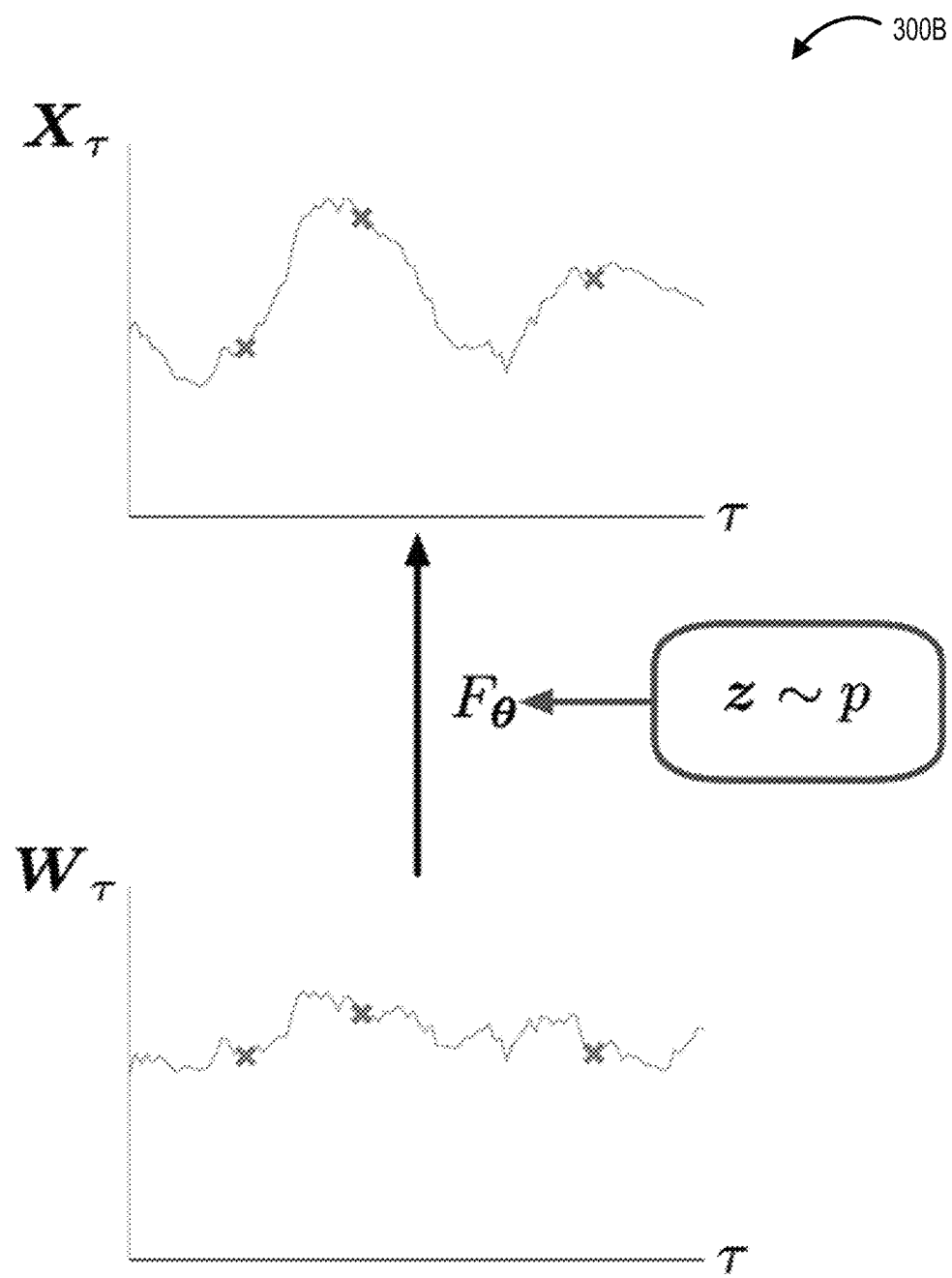
Figure 3C:
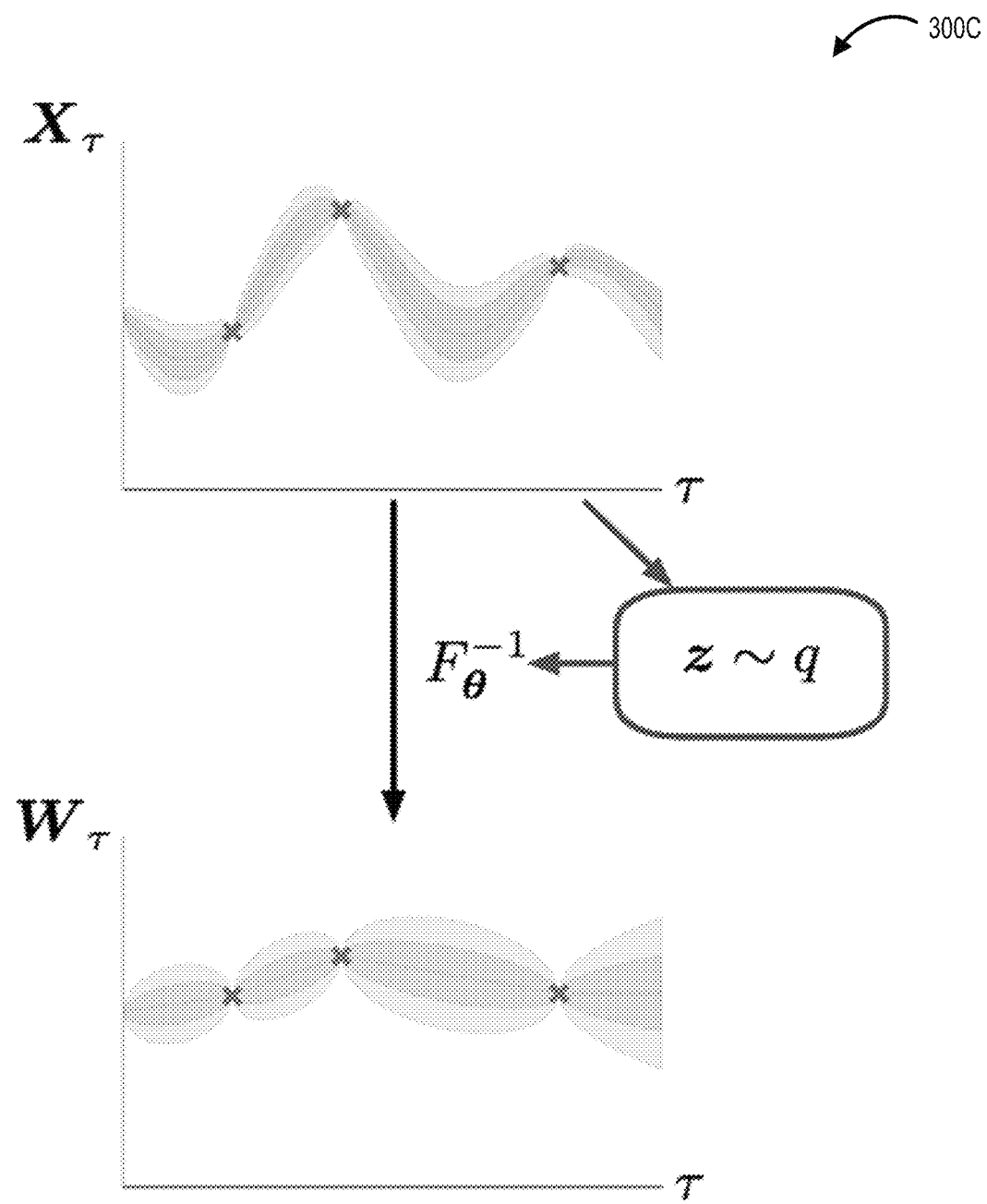

Reference is made to FIGS. 3A, 3B, and 3C, which illustrate features of embodiments of the continuous-time flow process operations, in accordance with embodiments of the present disclosure. FIG. 3A illustrates an example likelihood determining operation 300A, in accordance with an embodiment of the present disclosure. Given an irregular time series $\{x_{\tau_i}\}$, the inverse flow $F_\theta^{-1}$ may map an observed process to a set of Wiener points $\{w_{\tau_i}\}$ for which we can compute the likelihood according to Equation 7.

FIG. 3B illustrates an example sampling operation 300B, in accordance with an embodiment of the present disclosure. For example, sampling based on embodiments of CTFP may include: given the timestamps $\tau_i$, operations may sample a realization of the Wiener process $\{w_{\tau_i}\}_{i=1}^n$, then map the samples to $x_{\tau_i} = F_\theta(w_{\tau_i}; \tau_i)$. That is, given a set of timestamps $\{\tau_i\}$, operations may include sampling a Wiener process and using a forward flow $F_\theta$ to obtain a sample of the observed process.

FIG. 3C illustrates example interpolation and extrapolation operations 300C, in accordance with embodiments of the present disclosure. In some scenarios, to compute the density at an unobserved point $x_\tau$, operations may determine compute the left-sided (extrapolation; Equation 1) or two-sided (interpolation; Equation 2) conditional density of a Wiener point w, and conduct operations of adjusting for the flow (Equation 11, to be provided herein).

In FIGS. 3A, 3B, and 3C, the effect of the latent variables Z of a latent CTFP model may be indicated in the rectangular box shown in the respective drawings. The shaded areas may represent 70% and 95% confidence intervals.

In some embodiments, the normalizing flow $F_\theta(\bullet; \tau)$ may transform a base distribution induced by $W_\tau$ on an arbitrary time grid into a more complex shape in the observation space. In some scenarios, given a continuous realization of $W_\tau$, as long as $F_\theta(\bullet; \tau)$ is implemented as a continuous mapping, the resulting trajectory $x_\tau$ may also be continuous.

In some embodiments, one or more normalizing flow models indexed by time $\tau$ may be used as $F_\theta(\bullet; \tau)$ in Equation 6. In some embodiments, operations may include the continuous normalizing flow and ANODE because it may have a free-form Jacobian and efficient trace estimator [15, 21]. In particular, in some embodiments, the following may be an instantiation of ANODE as a generative model: For any $\tau \in [0, T]$ and $w_\tau \in \mathbb{R}^d$, a mapping $w_\tau$ to $x_\tau$ may be provided by solving the following initial value problem:

$$\frac{d}{dt}\begin{pmatrix} h_\tau(t) \\ a_\tau(t) \end{pmatrix} = \begin{pmatrix} f_\theta(h_\tau(t), a_\tau(t), t) \\ g_\theta(a_\tau(t), t) \end{pmatrix}, \begin{pmatrix} h_\tau(t_0) \\ a_\tau(t_0) \end{pmatrix} = \begin{pmatrix} w_\tau \\ \tau \end{pmatrix}, \tag{8}$$

where $h_\tau(t) \in \mathbb{R}^d$, $t \in [t_0, t_1]$, $f_\theta: \mathbb{R}^d \times \mathbb{R} \times [t_0, t_1] \to \mathbb{R}^d$, and $g_\theta: \mathbb{R} \times [t_0, t_1] \to \mathbb{R}$. Then $F_\theta$ in Equation 6 may defined as the solution of $h_\tau(t)$ at $t = t_1$:

$$F_\theta(\omega_\tau; \tau) = h_\tau(t_1) = h_\tau(t_0) + \int_{t_0}^{t_1} f_\theta(h_\tau(t), a_\tau(t), t)dt. \tag{9}$$

In some embodiments, the index t may represent the independent variable in the initial value problem and should not be confused with $\tau$, the timestamp of the observation.

Based on Equation 4, the log-likelihood $\mathcal{L}$ may be provided as follows:

$$\mathcal{L} = \sum_{i=1}^n \left[\log p_{w_{\tau_i}|w_{\tau_{i-1}}}(h_{\tau_i}(t_0)|h_{\tau_{i-1}}(t_0)) - \int_{t_0}^{t_1} tr\left(\frac{\partial f_\theta(h_{\tau_i}(t), a_{\tau_i}(t), t)}{\partial h_{\tau_i}(t)}\right)dt\right], \tag{10}$$

where $h_{\tau_i}(t_0)$ may be obtained by solving the ODE in Equation 8 backwards from $t=t_1$ to $t=t_0$, and the trace of the Jacobian may be estimated by Hutchinson's trace estimator [23, 21].

As described, in some embodiments, operations of the CTFP model may provide for interpolation and extrapolation operations. Time-indexed normalizing flows and the Brownian bridge may define conditional distributions on arbitrary timestamps. They may permit the CTFP model to provide operations for interpolation and extrapolation given partial observations, which may be beneficial with operations for time series modeling.

In some embodiments, interpolation means that a system may model the conditional distribution $$p_{x_\tau|x_{\tau_i}, x_{\tau_{i+1}}}(x_\tau|x_{\tau_i}, x_{\tau_{i+1}})$$

for all $\tau \in [\tau_i, \tau_{i+1}]$ and $i=1, \ldots, n-1$. Operations may include mapping the values $x_\tau$, $x_{\tau_i}$ and $x_{\tau_{i+1}}$ to $w_\tau$, $w_{\tau_i}$ and $w_{\tau_{i+1}}$, respectively. Equation 2 may be applied to obtain the conditional density of $$p_{w_\tau | w_{\tau_i}, w_{\tau_{i+1}}}(w_\tau | w_{\tau_i}, w_{\tau_{i+1}}).$$

Further:

$$\log p_{x_\tau | x_{\tau_i}, x_{\tau_{i+1}}}(x_\tau | x_{\tau_i}, x_{\tau_{i+1}}) = \quad (11)$$

$$\log p_{w_\tau | w_{\tau_i}, w_{\tau_{i+1}}}(w_\tau | w_{\tau_i}, w_{\tau_{i+1}}) - \log \left| \det \frac{\partial x_\tau}{\partial w_\tau} \right|.$$

In some embodiments, operations for extrapolation may be provided based on Equation 1. Accordingly, the model may predict continuous trajectories into future time periods, given past observations. FIG. 3C illustrates a visualization of interpolation and extrapolation based on operations of embodiments of the CTFP model, disclosed in the present disclosure.

In some embodiments, the CTFP model may inherit a Markov property from the Wiener process, which may be a strong assumption and may limit its ability to model stochastic processes with complex temporal dependencies. In order to enhance expressive power of the CTFP model, in some embodiments, operations may augment the CTFP model with a latent variable $Z \in \mathbb{R}^m$, whose prior distribution may be isotropic Gaussian $p_Z(z) = \mathcal{N}(z; 0, I_m)$. In particular, the data distribution may be approximated by a diverse collection of CTFP models conditioned on sampled latent variables z.

The generative model provided by Equation 6 may be augmented to $X_\tau = F_\theta(W_\tau; Z, \tau)$, $\forall \tau \in [0, T]$, which may provide a conditional distribution $X_{\tau_1}, \ldots, X_{\tau_n} | Z$. Similar to the initial value problem provided by Equation 8, $F_\theta(w_\tau; z, \tau) = h_\tau(t_1)$ may be defined, where $$\frac{d}{dt}\begin{pmatrix} h_\tau(t) \\ a_\tau(t) \end{pmatrix} = \begin{pmatrix} f_\theta(h_\tau(t), a_\tau(t), t) \\ g_\theta(a_\tau(t), t) \end{pmatrix}, \begin{pmatrix} h_\tau(t_0) \\ a_\tau(t_0) \end{pmatrix} = \begin{pmatrix} w_\tau \\ (z, \tau)^\top \end{pmatrix}. \quad (12)$$

Depending on the sample of the latent variable z, the CTFP model may include different gradient fields and may provide different output distributions.

For ease of notation, the subscripts of density functions may be omitted in the present disclosure. For the augmented generative model, the log-likelihood may be $\mathcal{L} = \log \int_{\mathbb{R}^m} p(x_{\tau_1}, \ldots, x_{\tau_n} | z) p(z) \, dz$, which may be intractable to evaluate.

Based on examples of variational autoencoder approaches [29], in some embodiments, model operations may include an approximate posterior distribution of $Z | X_{\tau_1}, \ldots, X_{\tau_n}$, denoted by $q(z | x_{\tau_1}, \ldots, x_{\tau_n})$. The implementation of the approximate posterior distribution may be an ODE-RNN encoder [44]. With the approximate posterior distribution, an importance-weighted autoencoder (IWAE) [6] lower bound of the log-likelihood on the right-hand side of the inequality may be derived:

$$\mathcal{L} = \log \mathbb{E}_{z \sim q}\left[\frac{p(x_{\tau_1}, \ldots, x_{\tau_n} | z) p(z)}{q(z | x_{\tau_1}, \ldots, x_{\tau_n})}\right] \geq \quad (13)$$

$$\mathbb{E}_{z_1, \ldots, z_K \sim q}\left[\log\left(\frac{1}{K}\sum_{k=1}^{K} \frac{p(x_{\tau_1}, \ldots, x_{\tau_n} | z_k) p(z_k)}{q(z_k | x_{\tau_1}, \ldots, x_{\tau_n})}\right)\right] =: \mathcal{L}_{IWAE},$$

where K is the number of samples from the approximate posterior distribution.

To illustrate some embodiments of the present disclosure, the following provides description of example models and synthetic data generated from common continuous-time stochastic processes and complex real-world datasets. Embodiments of the CTFP models and latent CTFP models may be compared with baseline models, such as latent ODEs [44] and variational RNNs (VRNNs) [12]. Example latent ODE models with the ODE-RNN encoder may be designed specifically to model time series data with irregular observation times. Example VRNN models may be variational filtering models that may demonstrate superior performance on structured sequential data.

For VRNNs, experiments were provided for appending the time gap between two observations as an additional input to the neural network. Both latent CTFP and latent ODE models may utilize ODE-RNN [44] as the inference network; GRU [11] may be used as the RNN cell in latent CTFP, latent ODE, and VRNN models. All latent variable models may have the same latent dimension and GRU hidden state dimension.

Synthetic datasets may be provided. In some experiments, three irregularly-sampled time series datasets may be simulated, and the datasets may be univariate. Geometric Brownian motion (GBM) may be a continuous-time stochastic process widely used in mathematical finance, and may satisfy the following stochastic differential equation: $dX_\tau = \mu X_\tau d\tau + \sigma X_\tau dW_\tau$, where $\mu$ and $\sigma$ are the drift term and variance term, respectively.

Example timestamps of observations may be in the range between 0 and T=30 and may be sampled from a homogeneous Poisson point process with an intensity of $\lambda_{train}=2$. To further evaluate the model's capacity to capture the dynamics of GBM, experiments tested the model with observation time-steps sampled from Poisson point processes with intensities of $\lambda_{test}=2$ and $\lambda_{test}=20$.

In some scenarios, OrnsteinUhlenbeck process (OU Process) may be another type of continuous-time stochastic process. The OU process may satisfy the following stochastic differential equation: $dX_\tau = \theta(\mu - X_\tau)d\tau + \sigma dW_\tau$. Experiments used the same set of observation intensities as in the above-described GBM experiments to sample observation time stamps in the training and test sets.

In some scenarios, to demonstrate the latent CTFP's capability to model sequences sampled from different continuous-time stochastic processes, experiments were conducted to train some embodiments of models on a dataset generated by mixing the sequences sampled from two different OU processes with different values of $\theta$, $\mu$, $\sigma$, and different observation intensities.

Reference is made to FIG. 4, which illustrates a table 400 of quantitative evaluation results based on the synthetic datasets described herein. The table 400 of FIG. 4 illustrates test negative log-likelihood on three synthetic stochastic processes across different models. Associated with each process is the intensity of the Poisson point process from which the timestamps for the test sequences were sampled. "Ground Truth" refers to the closed-form negative log-likelihood of the true underlying data generation process. Note that in the table 400 of FIG. 4, "GBM" denotes geometric Brownian motion; "OU" denotes Ornstein-Uhlenbeck process; and "M-OU" denotes mixture of OUs.

In the table 400 of FIG. 4, the exact negative log-likelihood (NLL) per observation for CTFP is shown. For latent ODE, latent CTFP, and VRNN, results include a report of the (upper bound of) NLL estimated by the IWAE bound [6] in Equation 13, using K=25 samples of latent variables. The table 400 of FIG. 4 also depicts the NLL of the test set computed with the ground truth density function.

The results on the test set sampled from the GBM indicate that the CTFP model may recover the true data generation process as the NLL estimated by CTFP is close to the ground truth. In contrast, latent ODE and VRNN models may fail to recover the true data distribution. On the M-OU dataset, the latent CTFP models show better performance than the other models. Moreover, latent CTFP outperforms CTFP by 0.016 nats, indicating its ability to leverage the latent variables.

Although trained on samples with an observation intensity of $\lambda_{train}=2$, embodiments of the CTFP model may better adapt to samples with a bigger observation intensity (and thus denser time grid) of $\lambda_{test}=20$. In some scenarios, the superior performance of CTFP models when $\lambda_{test}=20$ may be due to its capability to model continuous stochastic processes, whereas the baseline models may not have the notion of continuity. Such observations may be illustrated in ablation study findings (to be described in the present disclosure), where the base Wiener process may be replaced with i.i.d. Gaussian random variables, such that the base process is no longer continuous in time.

Figure 5A:
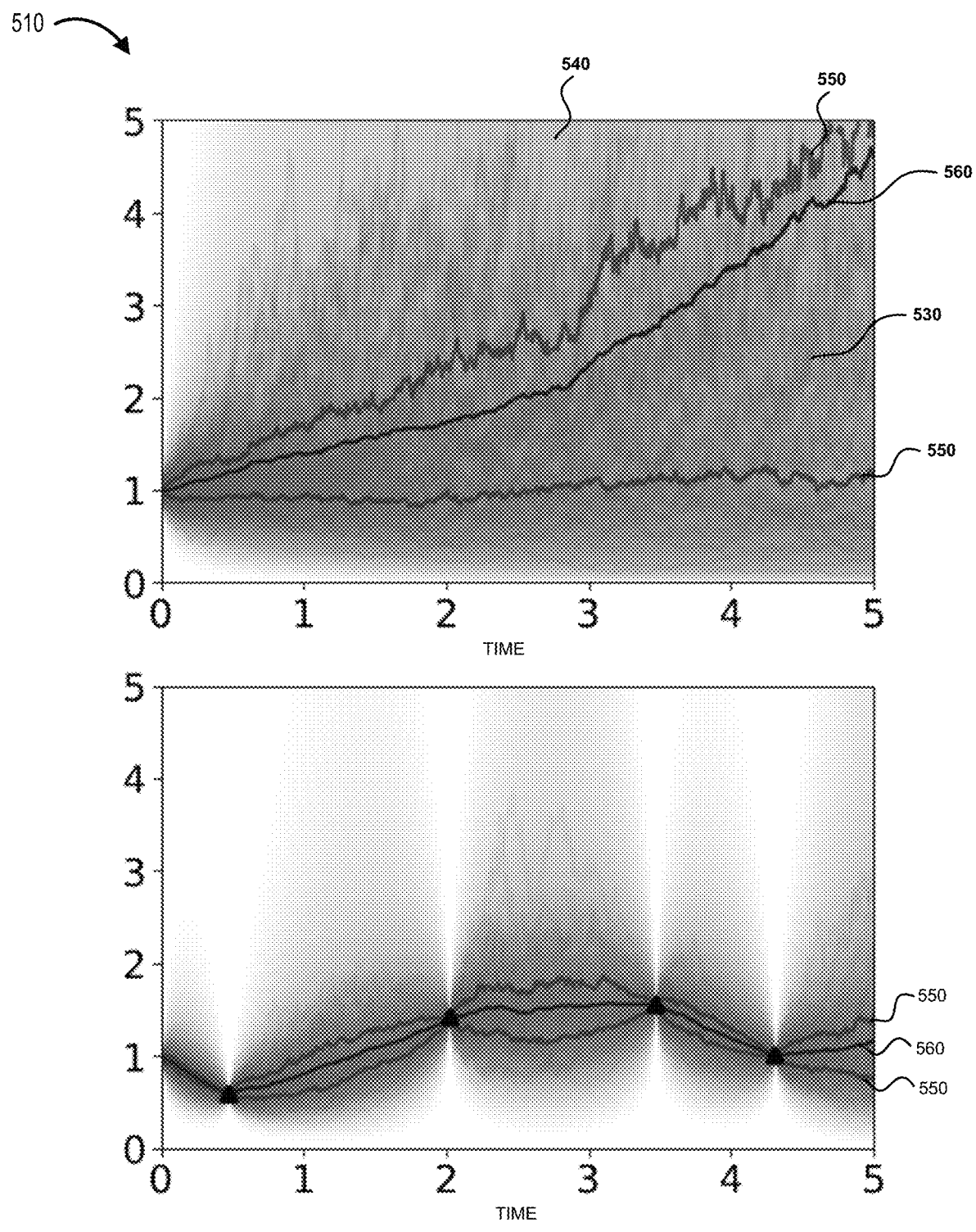
FIGS. 5A, 5B, and 5C illustrate a qualitative comparison between a Continuous-Time Flow Process (CTFP) and latent Ordinary Differential Equation (ODE) trained on the Geometric Brownian Motion (GBM) data, in accordance with an embodiment of the present disclosure.
Figure 5B:
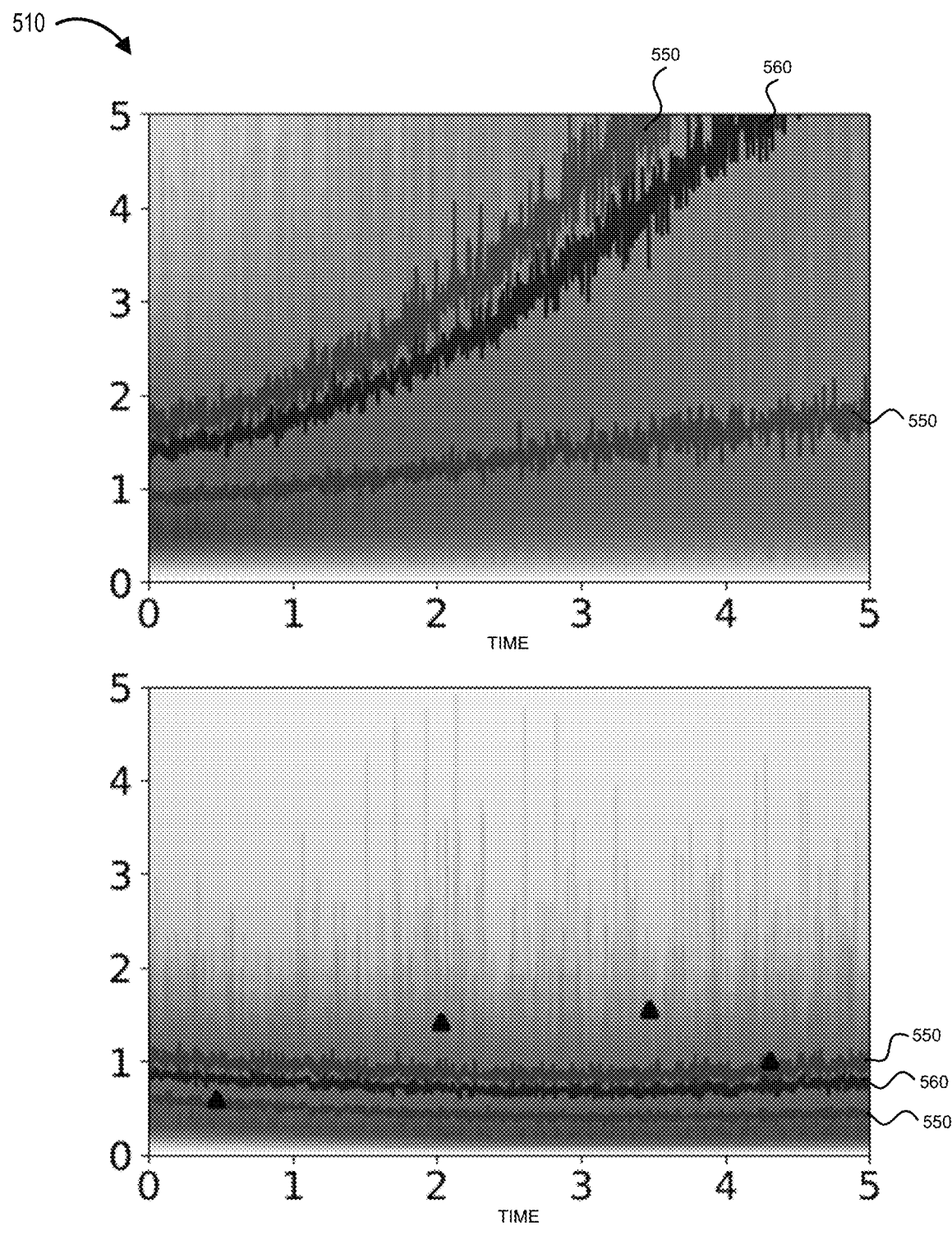
Figure 5C:
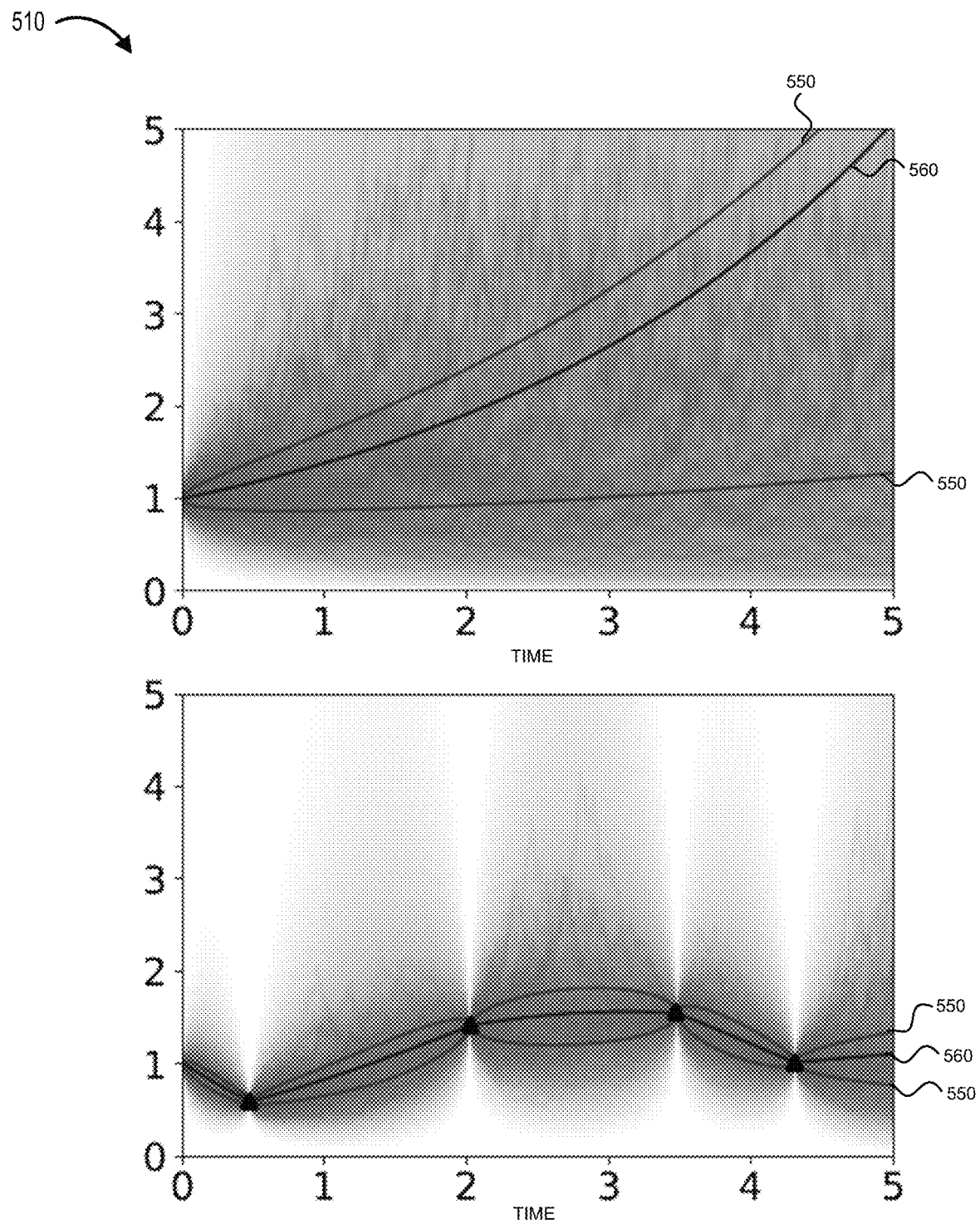

FIGS. 5A, 5B, and 5C illustrate a comparison between CTFP and latent ODE on the GBM data. Considered is the generation and interpolation tasks for CTFP (FIG. 5A), latent ODE (FIG. 5B), and ground truth (FIG. 5C). In the drawings, the upper panel 510 shows samples generated from the model and the lower panel 520 shows results for interpolation. The observed points for interpolation are marked by black triangles. In addition to the sampled trajectories 530 and the marginal density 540, illustrated are the sample-based estimates (closed-form for ground truth) of the inter-quartile range 550 and the mean 560 of the marginal density. For ease of exposition, the illustrations in FIGS. 5A, 5B, and 5C illustrate samples from models trained on a generic stochastic process (e.g., Geometric Brownian Motion, among other examples), and the x-axis and the y-axis may be rescaled. In some embodiments, the x-axis may represent time and the y-axis may represent a value based on the model being queried. In some scenarios, the values may have no specific semantic meaning.

FIGS. 5A, 5B, and 5C illustrate a qualitative comparison between CTFP and latent ODE trained on the GBM data, both on the generation task (upper panels 510) and the interpolation task (lower panels 520). Results illustrated by the upper panels 510 show that CTFP may generate continuous sample paths and accurately estimate the marginal mean and quantiles. In contrast, the sample paths generated by latent ODE may be more volatile and discontinuous due to its lack of continuity.

In some scenarios, for the interpolation task, the results of CTFP may be consistent with the ground truth in terms of both point estimation and uncertainty estimation. For latent ODE on the interpolation task, FIG. 5B shows that the latent variables from the variational posterior shift the density to the region where the observations lie. However, although latent ODE is capable of performing interpolation, there is no guarantee that the (reconstructed) sample paths pass through the observed points (triangular marks in FIG. 5B).

In addition to observed challenges with the interpolation task, a qualitative comparison between samples may further highlight the importance of embodiments of the CTFP models' continuity when generating samples of continuous dynamics.

Experiments were also conducted on real-world datasets having continuous or complex dynamics.

The following three datasets were considered. First, Mujoco-Hopper [44] includes 10,000 sequences that are simulated by a "Hopper" model from the DeepMind Control Suite in a MuJoCo environment [48].

Second, PTB Diagnostic Database (PTBDB) [4] includes excerpts of ambulatory electrocardiography (ECG) recordings. Each sequence is one-dimensional and the sampling frequency of the recordings is 125 Hz.

Further, a Beijing Air-Quality Dataset (BAQD) [49] may be a dataset consisting of multi-year recordings of weather and air quality data across different locations in Beijing. The variables may include temperature, pressure, and wind speed, and the values may have been recorded once per hour. In some experiments, the data was segmented into sequences, each covering the recordings of a whole week.

Similar to synthetic data experiment settings, experiments compared compare the CTFP and latent CTFP models against latent ODE and VRNN. In some scenarios, the latent ODE model in the original work [44] used a fixed output variance and was evaluated using mean squared error (MSE). Such a model was adapted with a predicted output variance. In some experiments, the effect of using RealNVP [14] as the invertible mapping $F_\theta(\bullet; \tau)$ was explored. This experiment can be regarded as an ablation study and is described herein with reference to ablation studies.

Reference is made to FIG. 6, which illustrates a table 600 of quantitative evaluation results based on real-world data described herein, in accordance with an embodiment of the present disclosure. In the table 600, a test negative log-likelihood on Mujoco-Hopper, Beijing Air-Quality Dataset (BAQD) and PTB Diagnostic Database (PTBDB) across a plurality of models.

For embodiments of the CTFP model provided in the present disclosure, the reported values are exact. For the other three example models, the reported results are based on IWAE bounds using K=125 samples. Lower values may correspond to better performance. Standard deviations were based on 5 independent runs.

The table 600 of FIG. 6 shows the exact negative log-likelihood (NLL) per observation for CTFP and the (upper bound of) NLL estimated by the IWAE bound, using K=125 samples of latent variables, for latent ODE, latent CTFP, and VRNN. For each setting, the mean and standard deviation of five evaluation runs are tabulated. The evaluation results show that the latent CTFP model outperforms VRNN and latent ODE models on real-world datasets, indicating that CTFP may be better at modeling irregular time series data with continuous dynamics.

The table 600 of FIG. 6 also suggests that the latent CTFP model may consistently outperforms the CTFP model, demonstrating that with the latent variables, the latent CTFP model may be more expressive and may be able to capture the data distribution better.

Finite-Dimensional Distribution of CTFP: As described in the present disclosure, Equation 7 (provided above) is the log density of the distribution obtained by applying the normalizing flow models to the finite-dimensional distribution of Wiener process on a given time grid. In some examples, query why the distribution described by Equation 7 necessarily matches the finite-dimensional distribution of $X_\tau = F_\theta(W_\tau, \tau)$. In other words, it may be left to close the gap between the distributions of samples obtained by two different ways to justify Equation 7: (1) first getting a sample path of $X_\tau$ by applying the transformation defined by $F_\theta$ to a sample of $W_\tau$ and then obtaining the finite-dimensional observation of $X_\tau$ on the time grid; (2) first obtaining the finite-dimensional sample of $W_\tau$ and applying the normalizing flows to this finite-dimensional distribution.

In some scenarios, to show the finite-dimensional distribution of CTFP, operations may work with the canonical Wiener space $(\Omega, \Sigma)$ equipped with the unique Wiener measure $\mu_W$ where $\Omega = C([0, +\infty), \mathbb{R}^d)$ may be the set of continuous functions from $[0, +\infty)$ to $\mathbb{R}^d$, $\Sigma$ is the Borel σ-algebra generated by all the cylinder sets of $C([0, +\infty), \mathbb{R}^d)$, and $W_\tau(\omega) = \omega(\tau)$ for $\omega \in \Omega$. Further description may be provided in secondary sources (see e.g., Chapter 2 of [35]).

Given a time grid $0 < \tau_1 < \tau_2 < \ldots < \tau_n$, the distribution of observations of Wiener process on this discrete time grid may be called the finite-dimensional distribution of $W_\tau$. It may be a push-forward measure on $(\mathbb{R}^{d \times n}, \mathcal{B}(\mathbb{R}^{d \times n}))$ induced by the projection mapping $\pi_{\tau_1, \tau_2, \ldots, \tau_n}: (\Omega, \Sigma) \to ((\mathbb{R}^{d \times n}, \mathcal{B}(\mathbb{R}^{d \times n})))$ on this grid where $\mathcal{B}(\bullet)$ denotes the Borel σ-algebra. Therefore, for each Borel (measurable) set B of $\mathbb{R}^{d \times n}$, the finite-dimensional distribution of B is $\mu_w \circ \pi^{-1}(B) = \mu_W(\{\omega | (W_{\tau_1}(\omega) \ldots W_{\tau_n}(\omega)) \in B\})$. In the present description, the subscript of $\pi$ is omitted for ease of notation. In the present example, the justification may be based at least on two propositions.

Proposition 1: Let $F_\theta(\bullet, \bullet)$ be defined as Equations 8 and 9. The mapping from $(\Omega, \Sigma, \mu_W)$ to $(\Omega, \Sigma)$ defined by $\omega(\tau) \to F_\theta(\omega(\tau), \tau)$ may be measurable and therefore induces a pushforward measure $\mu_W \circ F_\theta^{-1}$.

As an example proof: As $F_\theta$ is continuous in both $\omega$ and $\tau$, it may be shown that $F_\theta(\omega(\tau), \tau)$ is also continuous in $\tau$ for each $\omega$ continuous in $\tau$. As $F_\theta(\bullet, \tau)$ is invertible for each $\tau$, $F_\theta(\bullet, \tau)$ is an homeomorphsim between $\mathbb{R}^d$ and $\mathbb{R}^d$. Therefore, the pre-image of each Borel set of $\mathbb{R}^d$ under $F_\theta(\bullet, \tau)$ for each $\tau$ is also Borel. As a result, the pre-image of each cylinder set of $C([0, +\infty), \mathbb{R}^d)$ under the mapping defined by $F_\theta(\bullet, \bullet)$ may also be a cylinder set, which may be enough to show the mapping is measurable.

The proposition shows $X_\tau$ is a stochastic process also defined in the space of continuous functions as Wiener process. The present example provides a solid basis for defining finite-dimensional distribution of $X_\tau$ on $\mathbb{R}^{d \times n}$ in similar ways as Wiener process using projection. The two sampling methods mentioned above can be characterized by two different mappings from $(\Omega, \Sigma, \mu_W)$ to $(\mathbb{R}^{d \times n}, \mathcal{B}(\mathbb{R}^{d \times n}))$ (1) applying transformation defined by $F_\theta$ to a function in $C([0, +\infty), \mathbb{R}^d)$ and then applying the projection $\pi$ to the transformed function given a time grid; (2) applying the projection to a continuous function on a time grid and applying the transformation defined by $F_\theta(\bullet, \tau)$ for each $\tau$ individually. In some embodiments, the pushforward measures induced by the two mappings may be checked to agree on every Borel set of $\mathbb{R}^{d \times n}$ as their pre-images are the same in $(\Omega, \Sigma, \mu_W)$. Accordingly, the following proposition may be provided.

Proposition 2: Given a finite subset $\{\tau_1, \tau_2, \ldots, \tau_n\} \subset (0, +\infty)$, the finite-dimensional distribution of $X_\tau$ is the same as the distribution of $(F_\theta(W_{\tau_1}, \tau_1), \ldots, F_\theta(W_{\tau_n}, \tau_n))$, where $(W_{\tau_1}, \ldots, W_{\tau_n})$ is a n×d-dimensional random variable with finite-dimensional distribution of $W_\tau$.

Proof: It suffices to check that given the fixed time grid, for each Borel set $B \subset \mathbb{R}^{d \times n}$, the preimage of B is the same under the two mappings. They are both $\{\omega | (F_\theta(W_{\tau_1}(\omega), \tau_1), F_\theta(W_{\tau_2}(\omega), \tau_2), \ldots, F_\theta(W_{\tau_n}(\omega), \tau_n)) \in B\}$.

To supplement description of embodiments and features thereof that are described in the present disclosure, the following description provides further example details regarding synthetic dataset generation, real-world dataset pre-processing, model architecture as well as training and evaluation settings.

Synthetic Dataset: For the geometric Brownian motion (GBM), in some embodiments, systems may sample 10000 trajectories from a GBM with the parameters of $\mu = 0.2$ and a variance of $\sigma = 0.5$ in the interval of [0, 30]. The timestamps of the observations may be sampled from a homogeneous Poisson point process with an intensity of $\lambda_{train} = 2$. Systems may evaluate the model on the observations timestamps sampled from two homogeneous Poisson processes separately with intensity values of $\lambda_{test} = 2$ and $\lambda_{test} = 20$.

For the Ornstein-Uhlenbeck (OU) process, the parameters of the process that the system may sample trajectories from are $\theta = 2$, $\mu = 1$, and $\sigma = 10$. The system may be configured to also sample 10000 trajectories and utilize the same set of observation intensity values, $\lambda_{train}$ and $\lambda_{test}$, to sample observation timestamps from homogeneous Poisson processes for training and test.

For the mixture of OU processes (MOU), systems may sample 5000 sequences from each of two different OU processes and mix them to obtain 10000 sequences. One OU process has the parameters of $\theta = 2$, $\mu = 1$, and $\sigma = 10$ and the observation timestamps may be sampled from a homogeneous Poisson process with $\lambda_{train} = 2$. The other OU process may have the parameters of $\theta = 1.0$, $\mu = 2.0$, and $\sigma = 5.0$ with observation timestamps sampled with $\lambda_{train} = 20$.

For the 10000 trajectories of each dataset, systems may be configured to use 7000 trajectories for training and 1000 trajectories for validation. Systems may test the model on 2000 trajectories for each value of $\lambda_{test}$. To test the model with $\lambda_{test} = 20$ on GBM and OU process, systems may also use 2000 sequences.

Real-World Dataset Details: As described in the present disclosure, experiments were conducted to compare embodiments of the CTFP models against the baselines on three datasets: Mujoco-Hopper, Beijing Air-Quality dataset (BAQD), and PTB Diagnostic Database(PTBDB). The three datasets may be obtained at sources, such as:

http://www.cs.toronto.edu/rtqichen/datasets/HopperPhysics/training.pt https://www.kaggle.com/shayanfazeli/heartbeat/download https://archive.ics.uci.edu/ml/datasets/Beijing+Multi-Site+Air-Quality+Data In some experiments, the system padded all sequences into the same length for each dataset. The sequence length of the Mujoco-Hopper dataset was 200 and the sequence length of BAQD was 168. The maximum sequence length in the PTBDB dataset was 650. Systems were configured to rescale the indices of sequences to real numbers in the interval of [0, 120] and to obtain the rescaled values as observation timestamps for all datasets.

To make the sequences asynchronous or irregularly-sampled, systems were configured to sample observation timestamps $\{\tau_i\}_{i=1}^n$ from a homogeneous Poisson process with an intensity of 2 that is independent of the data. For each sampled timestamp, the value of the closest observation was taken as its corresponding value. The timestamps of all sampled sequences were shifted by a value of 0.2 since $W_0 = 0$ deterministically for the Wiener process and there may be no variance for the CTFP model's prediction at $\tau = 0$.

To supplement description of embodiments in the present disclosure, further model architecture details will be described.

To ensure a fair comparison, systems were configured to utilize the same values for hyper-parameters including the latent variable and hidden state dimensions across all models. For experiments, systems were configured to maintain underlying architectures as similar as possible and to use the same experimental protocol across all models.

For CTFP and Latent CTFP, systems were configured to utilize a one-block augmented neural ODE module that maps the base process to the observation process. For the augmented neural ODE model, systems were configured with an MLP model consisting of 4 hidden layers of size 32-64-64-32 for the model in Equation 8 and Equation 12.

In practice, the implementation of g in the two equations may be optional and its representation power may be fully incorporated into f. This architecture may be used for both synthetic and real-world datasets. For the latent CTFP and latent ODE models described above, systems were configured to use the ODE-RNN model as the recognition network. For synthetic datasets, the ODE-RNN model consists of a one-layer GRU cell with a hidden dimension of 20 (the rec-dims parameter in its original implementation) and a one-block neural ODE module that has a single hidden layer of size 100, and it outputs a 10-dimensional latent variable. The same architecture was used by both latent ODE and latent CTFP models.

For real-world datasets, the ODE-RNN architecture used a hidden state of dimension 20 in the GRU cell and an MLP with a 128-dimensional hidden layer in the neural ODE module. The ODE-RNN model produced a 64-dimensional latent variable. For the generation network of the latent ODE (V2) model, systems were configured to use an ODE function with one hidden layer of size 100 for synthetic datasets and 128 for real-world datasets. The decoder network has 4 hidden layers of size 32-64-64-32, and mapping a latent trajectory to outputs of Gaussian distributions at different time steps.

The VRNN model is implemented using a GRU network. The hidden state of the VRNN models may be 20-dimensional for synthetic and real-world datasets. The dimension of the latent variable is 64 for real-word datasets and 10 for synthetic datasets. Systems were configured to use an MLP of 4 hidden layers of size 32-64-64-32 for the decoder network, an MLP with one hidden layer that has the same dimension as the hidden state for the prior proposal network, and an MLP with two hidden layers for the posterior proposal network. For synthetic data sampled from Geometric Brownian Motion, we apply an exponential function to the samples of all models. Therefore the distribution precited by latent ODE and VRNN at each timestamp is a log-normal distribution.

In some example experiments, the following training and evaluation settings were used. For synthetic data, systems were configured to train all models using the IWAE bound with 3 samples and a flat learning rate of $5 \times 10^{-4}$ for all models. Systems were configured to also consider models trained with or without the aggressive training scheme proposed by [22] for latent ODE and latent CTFP.

In some experiments, systems were configured with the best-performing model among the ones trained with or without the aggressive scheme based IWAE bound, estimated with 25 samples on the validation set for evaluation. The batch size may be 100 for CTFP models and 25 for all the other models. For experiments on real-world datasets, systems were configured to conduct a hyper-parameter search on learning rates over two values of $5 \times 10^{-4}$ and $10^{-4}$, whether using the aggressive training schemes for latent CTFP and latent ODE models. Evaluation results of the best-performing model based on IWAE bound estimated with 125 samples were provided.

Some experiments were configured to provide ablation study results. In some experiments, additional experiment results on real-world datasets were obtained.

Reference is made to FIG. 7, which is a table 700 showing additional experiment results on real-world datasets using different intensity value λs of 1 and 5 to sample observation processes.

Experiments based on I.I.D. Gaussian as a base process were conducted. In this experiment, systems were configured to replace the base Wiener process with I.I.D Gaussian random variables and to keep the other components of the models substantially unchanged. This experimental model and its latent variant are named CTFP-IID-Gaussian and latent CTFP-IID-Gaussian. As a result, trajectories sampled from CTFP-IID-Gaussian may not be continuous and this experiment was conducted to study the continuous property of models and its impact on modeling irregular time series data with continuous dynamics.

Reference is made to FIG. 8 and FIG. 9, which illustrate tables showing results of the above-described experiment. The table 800 of FIG. 8 illustrates a comparison between embodiments of the CTFP model, CTFP-IID-Gaussian model, latent CTFP, and latent CTFP-IID-Gaussian on synthetic datasets. The results provide NLL per observation.

The table 900 of FIG. 9 illustrates a comparison between embodiments of the CTFP model, CTFP-IID-Gaussian, latent CTFP, and latent CTFP-IID-Gaussian on real-world datasets. The results provide NLL per observation.

Results based on the tables in FIGS. 8 and 9 show that CTFP may consistently outperforms CTFP-IID-Gaussian, and latent CTFP may outperform latent CTFP-IID-Gaussian. The results corroborate a hypothesis that the superior performance of CTFP models may be partially attributed to the continuous property of the model. Moreover, latent CTFP-IID-Gaussian may show similar but slightly better performance than latent ODE models. The results may be in accordance with the above-described hypothesis as the models are very similar and both models have no notion of continuity in the decoder. In some scenarios, the performance gain of latent CTFP-IID-Gaussian may be based on the use of (dynamic) normalizing flow which is more flexible than Gaussian distributions used by latent ODE.

Experiments based on CTFP-RealNVP: In the following experiment, systems were configured to replace the continuous normalizing flow in CTFP model with another normalizing flow model, RealNVP [14]. The variant of CTFP used for the experiment described below is named CTFP-RealNVP and its latent version may be termed latent CTFP-RealNVP. Note that the trajectories sampled from CTFP-RealNVP model may still be continuous. We evaluate CTFP-RealNVP and latent CTFP-RealNVP models on datasets with high dimensional data, Mujoco-Hopper, and BAQD.

Figure 10:
FIG. 10 illustrates a table showing a comparison between CTFP, CTFP-RealNVP and their latent variants on Mujoco-Hopper and BAQD datasets, in accordance with an embodiment of the present disclosure.

Reference is made to FIG. 10, which illustrates a table 1000 showing results of the present experiment. The table 1000 of FIG. 10 is a comparison between CTFP, CTFP-RealNVP, and their latent variants on Mujoco-Hopper and BAQD datasets. The results provide NLL per observation.

The table 1000 of FIG. 10 shows that CTFP-RealNVP may outperform embodiments of the CTFP model. However, when incorporating the latent variable, the latent CTFP-RealNVP model may perform significantly worse than embodiments of the latent CTFP model. The worse performance may be because RealNVP may not make full use of information in the latent variable due to its structural constraints.

The table indicates that CTFP-RealNVP outperforms CTFP. However, when incorporating the latent variable, the latent CTFP-RealNVP performs significantly worse than latent CTFP. The worse performance might be because RealNVP cannot make full use of the information in the latent variable due to its structural constraints.

The following description provides additional details for latent ODE models based on Mujoco-Hooper data. In some examples, systems may focus on point estimation and may be configured to utilize the mean squared error as the performance metric [44]. When applied to embodiments of the present disclosure and evaluated using the log-likelihood, embodiments of the model performs unsatisfactorily.

Reference is made to FIG. 11, which illustrates a table 1100 showing a comparison of different version of latent ODE models on Mujoco-Hooper datasets. In the table 1100 of FIG. 11, the first row shows the negative log-likelihood on the Mujoco-Hopper dataset. The inferior NLL of the original latent ODE may be caused by the use of a fixed output variance of $10^{-6}$, which may magnify a small reconstruction error.

To mitigate the above-described issue, in some embodiments, two modified versions of the latent ODE model may be provided. In a first version (V1), given a pretrained (original) latent ODE model, systems may be configured to conduct a logarithmic scale search for the output variance and identify a value that gives the best performance on the validation set.

In a second version (V2), systems may be configured to utilize an MLP to predict the output mean and variance. Both modified versions may have better performance than the original model, as shown in the table 1100 of FIG. 11 at rows 2-3. Further, the second version of the latent ODE model (V2) may outperform the first version (V1) on the Mujoco-Hopper dataset. Therefore, systems may be configured based on the second version for experiments described in the present disclosure.

Qualitative Sample for VRNN Model: in some experiments, trajectories were sampled from the VRNN model [12] trained on Geometric Brownian Motion (GBM) by running the model on a dense time grid. The trajectories are illustrated in FIGS. 12A and 12B, in accordance with embodiments of the present disclosure.

A comparison of trajectories sampled from the model with trajectories sampled from GBM is provided. As illustrated, the sampled trajectories from VRNN may not be continuous in time.

Figure 12A:
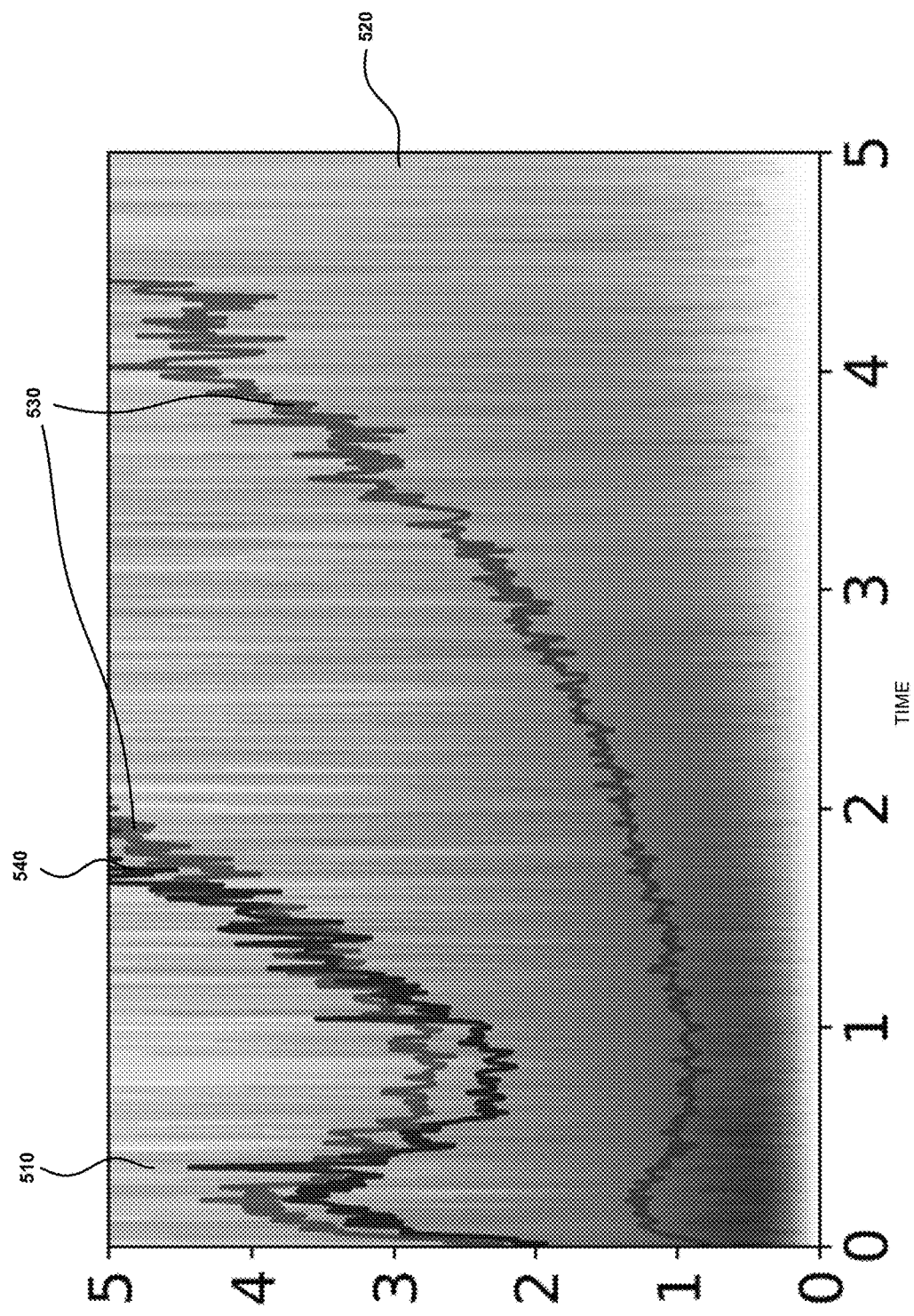
FIG. 12A illustrates sample trajectories and marginal density estimation by VRNN, in accordance with embodiments of the present disclosure.
Figure 12B:
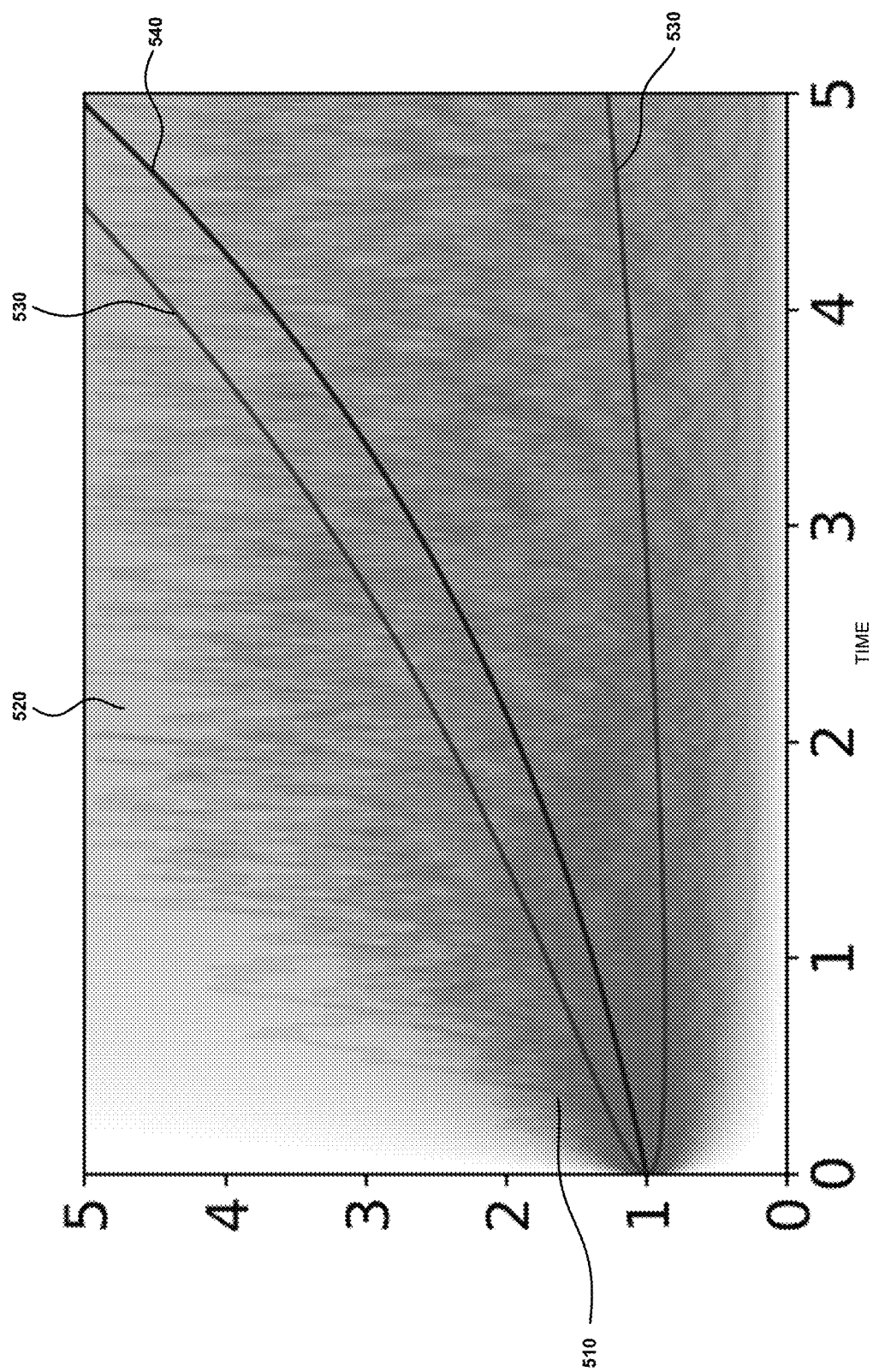
FIG. 12B illustrates a comparison of the results with sample trajectories and marginal density with ground truth, in accordance with embodiments of the present disclosure.

In FIG. 12A, sample trajectories and marginal density estimation by VRNN are illustrated. In FIG. 12B, a comparison of the results with sample trajectories and marginal density with ground truth is illustrated. In addition to the sample trajectories 510 and the marginal density 520, FIGS. 12A and 12B also show the sample-based estimates (closed-form for ground truth) of the interquartile range 530 and mean 540 of the marginal density. The illustrates in FIGS. 12A and 12B illustrate samples from models trained on a generic stochastic process (e.g., Geometric Brownian Motion), and the x-axis and the y-axis may be rescaled. In some embodiments, the x-axis may represent time and the y-axis may represent a value based on the model being queried. In some scenarios, the values may have no specific semantic meaning.

In some experiments, systems were configured to use VRNN to estimate the marginal density of X, for each $\tau \in (0,5]$. Some results are shown in FIGS. 12A and 12B. It may not be straightforward to use VRNN model for marginal density estimation. For each timestamp $\tau \in (0,5]$, systems may obtain the marginal density of $X_\tau$ by running VRNN on a time grid with two timestamps, 0 and $\tau$: at the first step, the input to VRNN model is $x_0=1$ and we can get prior distributions of the latent variable $Z_\tau$. Note that a sampled trajectory from GBM is always 1 when $\tau=0$.

Conditioned on the sampled latent codes $z_0$ and $z_\tau$, VRNN proposes $p(x_\tau|x_0, z_\tau, z_0)$ at the second step. We average the conditional density over 125 samples of $Z_\tau$ and $Z_0$ to estimate the marginal density.

The marginal density estimated using a time grid with two timestamps may not be consistent with the trajectories sampled on a different dense time grid. The results indicate that the choice of time grid may have an impact on the distribution modeled by VRNN, and the distributions modeled by VRNN on different time grids may be inconsistent. In contrast, embodiments of CTFP models described in the present disclosure may not be susceptible to the above-described issues.

Figure 13:
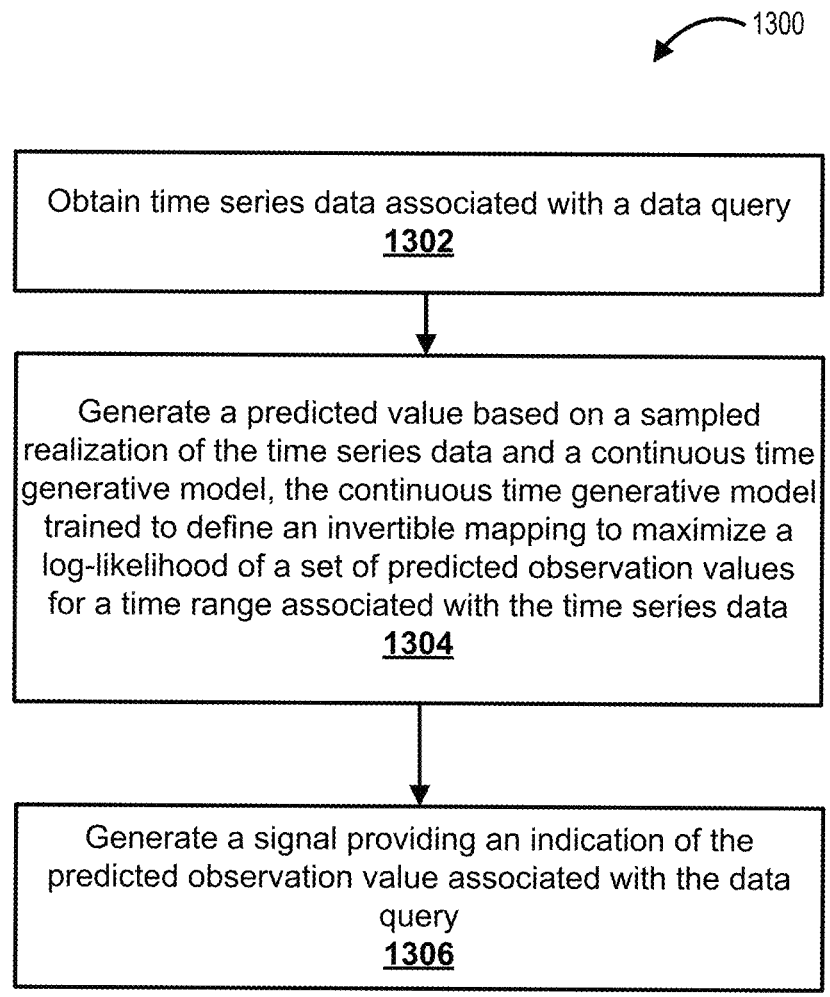
FIG. 13 illustrates a flowchart of a method for machine learning architecture for time series data prediction, in accordance with embodiments of the present disclosure.

Reference is made to FIG. 13, which illustrates a flowchart of a method 1300 for machine learning architecture for time series data prediction, in accordance with embodiments of the present disclosure. The method 1300 may be conducted by the processor 202 of the system 200 (FIG. 2). Processor-executable instructions may be stored in the memory 206 and may be associated with the machine learning application 212 or other processor-executable applications not illustrated in FIG. 2. The method 1300 may include operations such as data retrievals, data manipulations, data storage, or other operations, and may include computer-executable operations.

Embodiments disclosed herein may be applicable to natural processes, such as environmental conditions, vehicle travel statistics over time, electricity consumption over time, asset valuation in capital markets, among other examples. In some other examples, generative models disclosed herein may be applied for natural language processing, recommendation systems, traffic pattern prediction, medical data analysis, or other types of forecasting based on irregular time series data. It may be appreciated that embodiments of the present disclosure may be implemented for other types of data sampling or prediction, likelihood density determination, or inference tasks such as interpolation or extrapolation based on irregular time series data sets.

At operation 1302, the processor may obtain time series data associated with a data query. A data query may be associated with a data sampling operation or a prediction operation, such as traffic pattern prediction, recommendation systems, weather forecasting, among other examples.

For embodiments associated with data sampling operations, the obtained time series data may be a set of time stamps associated with a desired prediction of an observable process. In some embodiments, the obtained time series data may be an incomplete realization of a continuous stochastic process. Accordingly, the desired sampling or prediction operations may be conducted for determining observed data points.

For embodiments associated with likelihood calculations, the obtained time series data may be an irregular time series data set and, as will be described, the irregular series data set may be an observed process to be mapped based on a reversible mapping function to a set of data points of a Weiner process (or other continuous stochastic process), for which a likelihood determination may be made.

For embodiments associated with inference tasks, such as interpolation or extrapolation, the obtained time series data may include unobserved data points and, as will be described, a conditional density of corresponding data points of the Weiner process may be determined.

At operation 1304, the processor may generate a predicted value based on a sampled realization of the time series data and a continuous time generative model. The continuous time generative model may be trained to define an invertible mapping to maximize a log-likelihood of a set of predicted observation values for a time range associated with the time series data. At operation 1306, the processor may generate a signal providing an indication of the predicted observation value associated with the data query.

As an example, $\{(x_{\tau_i}, \tau_i)\}_{i=1}^n$, may be a sequence of irregularly spaced time series data. In some embodiments, the continuous time generative model may be defined as a continuous-time flow process (CTFP), and the continuous-time flow process $\{F_\theta(W_\tau, \tau)\}_{\tau \in [0,T]}$ may be provided such that $$X_\tau = F_\theta(W_\tau; \tau), \forall \tau \in [0, T],$$

where $F_\theta(\bullet; \tau): \mathbb{R}^d \to \mathbb{R}^d$ is the invertible mapping parametrized by the learnable parameters $\theta$ for every $\tau \in [0, T]$, and $W_\tau$ is a d-dimensional Wiener process. In the present example, the stochastic process may be associated with a joint distribution of $(X_{\tau_1}, \ldots, X_{\tau_n})$, and the continuous time generative model may be based on modeling $\{X_\tau\}_{\tau \in [0,T]}$ such that the log-likelihood of the observations $$\mathcal{L} = \log p_{x_{\tau_1}, \ldots, x_{\tau_n}}(x_{\tau_1}, \ldots, x_{\tau_n})$$

may be maximized.

As described in the present disclosure, a plurality of different normalizing flow models may be indexed by time $\tau$ may be used as $F_\theta(\bullet; \tau)$. For ease of exposition, the continuous normalizing flow and ANODE is provided as an illustrating example because it has a free-form Jacobian and efficient race estimator. To illustrate, the following is an instantiation of ANODE as a generative model: For any $\tau \in [0, T]$ and $w_\tau \in \mathbb{R}^d$, a mapping $w_\tau$ to $x_\tau$ may be provided by solving the following initial value problem:

$$\frac{d}{dt}\begin{pmatrix} h_\tau(t) \\ a_\tau(t) \end{pmatrix} = \begin{pmatrix} f_\theta(h_\tau(t), a_\tau(t), t) \\ g_\theta(a_\tau(t), t) \end{pmatrix}, \begin{pmatrix} h_\tau(t_0) \\ a_\tau(t_0) \end{pmatrix} = \begin{pmatrix} w_\tau \\ \tau \end{pmatrix},$$

where $h_\tau(t) \in \mathbb{R}^d$, $t \in [t_0, t_1]$, $f_\theta: \mathbb{R}^d \times \mathbb{R} \times [t_0, t_1] \to \mathbb{R}^d$, and $g_\theta: \mathbb{R} \times [t_0, t_1] \to \mathbb{R}$. Then $F_\theta$ in may defined as the solution of $h_\tau(t)$ at $t = t_1$:

$$F_\theta(w_\tau; \tau) := h_\tau(t_1) = h_\tau(t_0) + \int_{t_0}^{t_1} f_\theta(h_\tau(t), a_\tau(t), t)dt.$$

The index t may represent the independent variable in the initial value problem.

Further, the log-likelihood $\mathcal{L}$ may be provided as follows:

$$\mathcal{L} = \sum_{i=1}^n \left[ \log p_{W_{\tau_i}|W_{\tau_{i-1}}}(h_{\tau_i}(t_0)|h_{\tau_{i-1}}(t_0)) - \int_{t_0}^{t_1} tr\left(\frac{\partial f_\theta(h_{\tau_i}(t), a_{\tau_i}(t), t)}{\partial h_{\tau_i}(t)}\right) dt \right],$$

where $h_{\tau_i}(t_0)$ may be obtained by solving an ODE backwards from $t = t_1$ to $t = t_0$, and the trace of the Jacobian may be estimated by Hutchinson's trace estimator [23, 21].

In some embodiments, the predicted value may be associated with one or more observed process data points based on a sampled realization of a Weiner process and the invertible mapping to provide a time continuous observed realization of the Weiner process.

In some embodiments, the invertible mapping may be based on training operations for decoding or deforming a base continuous Weiner process (or other continuous stochastic processes) into a complex observable process based on a dynamic instance of normalizing flows, as described with reference to some embodiments of the present disclosure.

Although the above-described example of an invertible mapping is based on a d-dimensional Wiener process, it may be contemplated that the continuous-time flow process may be based on other types of continuous stochastic process.

In some scenarios, it may be beneficial to bolster expressive power of embodiments of the continuous time generative model disclosed herein with a latent variable $Z \in \mathbb{R}^m$, whose prior distribution may be isotropic Gaussian $p_Z(z) = \mathcal{N}(z; 0, I_m)$. Thus, in some embodiments, the invertible mapping may be parameterized by a latent variable having an isotropic Gaussian prior distribution.

In some embodiments, the data distribution may be approximated by a diverse collection of CTFP models conditioned on sampled latent variable z.

In some embodiments, the continuous time generative model may be augmented to $X_\tau = F_\theta(W_\tau; Z, \tau)$, $\forall \tau \in [0, T]$, which may provide a conditional distribution $X_{\tau_1}, \ldots, X_{\tau_n} | Z$. Similar to the initial value problem described in above examples, $F_\theta(w_\tau; z, \tau) = h_\tau(t_1)$ may be defined, where $$\frac{d}{dt}\begin{pmatrix} h_\tau(t) \\ a_\tau(t) \end{pmatrix} = \begin{pmatrix} f_\theta(h_\tau(t), a_\tau(t), t) \\ g_\theta(a_\tau(t), t) \end{pmatrix}, \begin{pmatrix} h_\tau(t_0) \\ a_\tau(t_0) \end{pmatrix} = \begin{pmatrix} w_\tau \\ (z, \tau)^\top \end{pmatrix}.$$

Depending on the sample of the latent variable z, the generative model may have different gradient fields, thereby having different output distributions.

For the augmented generative model, the log-likelihood may be $\mathcal{L} = \log \int_{\mathbb{R}^m} p(x_{\tau_1}, \ldots, x_{\tau_n}|z)p(z)\, dz$, which may be intractable to evaluate. Based on examples of variational autoencoder approaches [29], in some embodiments, model operations may include an approximate posterior distribution of $Z|X_{\tau_1}, \ldots, X_{\tau_n}$, denoted by $q(z|X_{\tau_1}, \ldots, X_{\tau_n})$. The implementation of the approximate posterior distribution may be an ODE-RNN encoder [44]. With the approximate posterior distribution, an importance-weighted autoencoder (IWAE) [6] lower bound of the log-likelihood on the right-hand side of the inequality may be derived:

$$\mathcal{L} = \log \mathbb{E}_{z \sim q}\left[\frac{p(x_{\tau_1}, \ldots, x_{\tau_n}|z)p(z)}{q(z|x_{\tau_1}, \ldots, x_{\tau_n})}\right] \geq$$

$$\mathbb{E}_{z_1, \ldots, z_K \sim q}\left[\log\left(\frac{1}{K}\sum_{k=1}^K \frac{p(x_{\tau_1}, \ldots, x_{\tau_n}|z_k)p(z_k)}{q(z_k|x_{\tau_1}, \ldots, x_{\tau_n})}\right)\right] =: \mathcal{L}_{IWAE},$$

where K may be the number of samples from the approximate posterior distribution.

In some embodiments, the obtained time series data may include observed process data points. The predicted value may represent a likelihood determination of stochastic process data points based on the observed data points and an inverse of the invertible mapping of the continuous time generative model.

In some embodiments, the obtained time series data may include unobserved process data points. The predicted value may represent a conditional probability density of stochastic data points based on the unobserved process data points and an inverse of the invertible mapping of the continuous time generative model. In some embodiments, the conditional probability density provides for data point interpolation associated with the stochastic process based on a Brownian bridge. In some embodiments, the conditional probability density provides for data point extrapolation of data points associated with the stochastic process based on a multivariate Gaussian conditional probability distribution.

Figure 14:
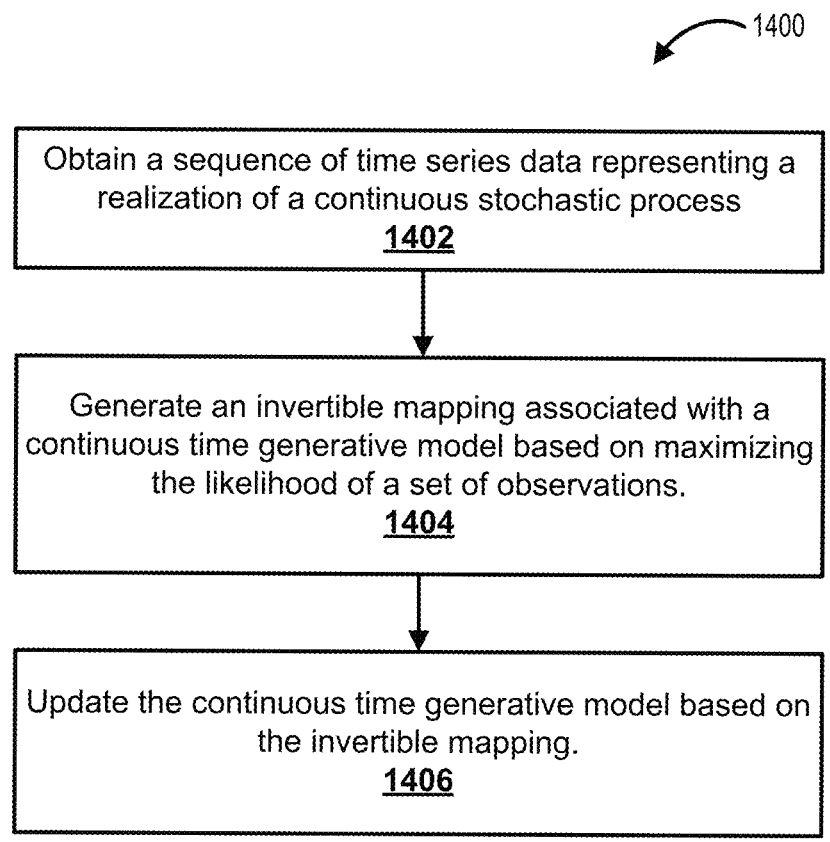
FIG. 14 illustrates a flowchart of a method for machine learning architecture, in accordance with embodiments of the present disclosure.

Reference is made to FIG. 14, which illustrates a flowchart of a method 1400 for machine learning architecture, in accordance with embodiments of the present disclosure. The method 1400 may be conducted by the processor 202 of the system 200 (FIG. 2) for training or generating a continuous time generative model. Processor-executable instructions may be stored in the memory 206 and may be associated with the machine learning application 212 or other processor-executable applications not illustrated in FIG. 2. The method 1400 may include operations such as data retrievals, data manipulations, data storage, or other operations, and may include computer-executable operations.

At operation 1402, the processor may obtain time series data. In some embodiments, the time series data may be a sequence of regularly spaced or a sequence of irregularly spaced time series data. The obtained time series data may be an incomplete realization of a continuous stochastic process $\{X_\tau\}_{\tau \in [0,T]}$ and the stochastic process may induce a joint distribution $(X_{\tau_1}, \ldots, X_{\tau_n})$. In some scenarios, it may be beneficial to model $\{X_\tau\}_{\tau \in [0,T]}$ such that the log-likelihood of the observations $$\mathcal{L} = \log p_{x_{\tau_1}, \ldots, x_{\tau_n}}(x_{\tau_1}, \ldots, x_{\tau_n})$$

may be maximized.

At operation 1404, the processor may generate an invertible mapping associated a continuous time generative model by maximizing the likelihood of the set of observations. The continuous-time flow $\{F_\theta(W_\tau; \tau)\}_{\tau \in [0,T]}$ may be defined such that $X_\tau = F_\theta(W_\tau; \tau)$, $\forall \tau \in [0, T]$, where $F_\theta(\bullet; \tau): \mathbb{R}^d \to \mathbb{R}^d$ is an invertible mapping parametrized by the learnable parameters $\theta$ for every $\tau \in [0, T]$, and $W_\tau$ is a d-dimensional Wiener process.

In some embodiments, the log-likelihood relation may be reformulated using the change of variables formula, where $w_{\tau_i} = F_\theta^{-1}(x_{\tau_i}; \tau_i)$. Then $$\mathcal{L} = \sum_{i=1}^{n} \left[ \log p_{W_{\tau_i}|W_{\tau_{i-1}}}(w_{\tau_i}|w_{\tau_{i-1}}) - \log \left| \det \frac{\partial F_\theta(w_{\tau_i}; \tau_i)}{\partial w_{\tau_i}} \right| \right],$$

where $\tau_0 = 0$, $W_0 = 0$, and $$p_{W_{\tau_i}|W_{\tau_{i-1}}}$$

is described above.

In some embodiments, the generated invertible mapping may be augmented with a latent variable having a prior distribution that may be an isotropic Gaussian, as described in some examples of the present disclosure.

At operation 1406, the processor may update the continuous time generative model based on the invertible mapping.

The invertible mapping and the continuous time generative model may be generated or updated over time based on sequences of irregularly spaced time series data obtained or captured over time. In some embodiments, the invertible mapping and the associated continuous time generative model may be configured to decode base continuous stochastic processes into a complex observable process using a dynamic instance of normalizing flows, thereby enabling inference tasks that may otherwise be unattainable when receiving datasets having complex or multivariate dynamics or when receiving data sets having irregularly spaced or arbitrary timestamps. In some embodiments, the invertible mapping may be augmented with latent variables, and continuous time generative models may be optimized based on variational optimization operations.

Training and generation of embodiments of the continuous time generative model, and the associated invertible mapping, may be used for operations for querying the continuous time generative model, including sampling operations, likelihood determination operations, or inference operations including data interpolation or extrapolation tasks. Example operations using the continuous time generative model may include natural language processing operations, weather forecasting operations, pedestrian behaviour prediction operations for autonomous vehicles, among other examples.

Embodiments described in the present disclosure include systems that may be configured to conduct operations of a continuous-time flow process (CTFP) model, a reversible generative model for stochastic processes, and an associated latent variant. In some embodiments, the systems may be configured to map a continuous-time stochastic process, i.e., the Wiener process, into a more complicated process in the observable space. Beneficial or desirable properties of the Wiener process may be retained, including the efficient sampling of continuous paths, likelihood evaluation on arbitrary timestamps, and inter-/extrapolation given observed data. Example experiment results described in the present disclosure illustrate advantages and superior performance of some embodiments of the proposed models on various datasets, as compared to other models.

REFERENCES

[1] D. Barber. Bayesian Reasoning and Machine Learning. Cambridge University Press, 2012.

[2] L. E. Baum and T. Petrie. Statistical inference for probabilistic functions of finite state markov chains. In The Annals of Mathematical Statistics, 1966.

[3] Jens Behrmann, Will Grathwohl, Ricky T Q Chen, David Duvenaud, and Joern-Henrik Jacobsen. Invertible residual networks. In International Conference on Machine Learning, pages 573-582, 2019.

[4] R Bousseljot, D Kreiseler, and A Schnabel. Nutzung der ekg-signaldatenbank cardiodat der ptb über das Internet. Biomedizinische Technik/Biomedical Engineering, 40(s1):317-318, 1995.

[5] Samuel R Bowman, Luke Vilnis, Oriol Vinyals, Andrew M Dai, Rafal Jozefowicz, and Samy Bengio. Generating sentences from a continuous space. arXiv preprint arXiv:1511.06349, 2015.

[6] Yuri Burda, Roger Grosse, and Ruslan Salakhutdinov. Importance weighted autoencoders. In International Conference on Learning Representations, 2016.

[7] O. CappÃ©, S. J. Godsill, and E. Moulines. An overview of existing methods and recent advances in sequential monte carlo. In Proceedings of the IEEE, 2007.

[8] O. CappÃ©, E. Moulines, and T. RydÃ©en. Hidden Markov Models and Dynamical Systems. Springer, 2005.

[9] Tian Qi Chen, Jens Behrmann, David K Duvenaud, and Jörn-Henrik Jacobsen. Residual flows for invertible generative modeling. In Advances in Neural Information Processing Systems, pages 9913-9923, 2019.

[10] Tian Qi Chen, Yulia Rubanova, Jesse Bettencourt, and David K Duvenaud. Neural ordinary differential equations. In Advances in neural information processing systems, pages 6571-6583, 2018.

[11] Kyunghyun Cho, Bart van Merrienboer, Caglar Gulcehre, Dzmitry Bandanau, Fethi Bougares, Holger Schwenk, and Yoshua Bengio. Learning phrase representations using rnn encoderdecoder for statistical machine translation. In Proceedings of the 2014 Conference on Empirical Methods in Natural Language Processing (EMNLP), pages 1724-1734, 2014.

[12] Junyoung Chung, Kyle Kastner, Laurent Dinh, Kratarth Goel, Aaron C Courville, and Yoshua Bengio. A recurrent latent variable model for sequential data. In Advances in neural information processing systems, pages 2980-2988, 2015.

[13] Laurent Dinh, David Krueger, and Yoshua Bengio. NICE: Non-linear independent components estimation. arXiv preprint arXiv:1410.8516, 2014.

[14] Laurent Dinh, Jascha Sohl-Dickstein, and Samy Bengio. Density estimation using RealNVP. In International Conference on Learning Representations, 2017.

[15] Emilien Dupont, Arnaud Doucet, and Yee Whye Teh. Augmented neural ODEs. In Advances in Neural Information Processing Systems, pages 3134-3144, 2019.

[16] James Durbin and Siem Jan Koopman. Time Series Analysis by State Space Methods. Oxford University Press, 2012.

[17] E. Fox, E. Sudderth, M. Jordan, and A. Willsky. Non-parametric bayesian learning of switching linear dynamical systems. In NeurIPS, 2008.

[18] Marco Fraccaro, Soren Kaae Sønderby, Ulrich Paquet, and Ole Winther. Sequential neural models with stochastic layers. In Advances in neural information processing systems, pages 2199-2207, 2016.

[19] Marta Garnelo, Dan Rosenbaum, Christopher Maddison, Tiago Ramalho, David Saxton, Murray Shanahan, Yee Whye Teh, Danilo Rezende, and SM Ali Eslami. Conditional neural processes. In International Conference on Machine Learning, pages 1704-1713, 2018.

[20] Marta Garnelo, Jonathan Schwarz, Dan Rosenbaum, Fabio Viola, Danilo J Rezende, S M Eslami, and Yee Whye Teh. Neural processes. arXiv preprint arXiv:1807.01622, 2018.

[21] Will Grathwohl, Ricky T. Q. Chen, Jesse Bettencourt, and David Duvenaud. Scalable reversible generative models with free-form continuous dynamics. In International Conference on Learning Representations, 2019.

[22] Junxian He, Daniel Spokoyny, Graham Neubig, and Taylor Berg-Kirkpatrick. Lagging inference networks and posterior collapse in variational autoencoders. arXiv preprint arXiv:1901.05534, 2019.

[23] Michael F Hutchinson. A stochastic estimator of the trace of the influence matrix for laplacian smoothing splines. Communications in Statistics-Simulation and Computation, 19(2):433-450, 1990.

[24] K. Ito and K. Xiong. Gaussian filters for nonlinear filtering problems. In IEEE Trans. on Automatic Control, 2000.

[25] J. M. Wang, D. J. Fleet, and A. Hertzmann. Gaussian process dynamical models for human motion. In PAMI, 2008.

[26] S. J. Julier and J. K. Uhlmann. A new extension of the kalman filter to nonlinear systems. In Aerospace/Defense Sensing, Simulation and Controls, 1997.

[27] R. E. Kalman. A new approach to linear filtering and prediction problems. In Journal of Basic Engineering, 1960.

[28] Hyunjik Kim, Andriy Mnih, Jonathan Schwarz, Marta Garnelo, Ali Eslami, Dan Rosenbaum, Oriol Vinyals, and Yee Whye Teh. Attentive neural processes. In International Conference on Learning Representations, 2019.

[29] Diederik P Kingma and Max Welling. Auto-encoding variational bayes. In International Conference on Learning Representations, 2014.

[30] Durk P Kingma and Prafulla Dhariwal. Glow: Generative flow with invertible 1×1 convolutions. In Advances in Neural Information Processing Systems, pages 10215-10224, 2018.

[31] Durk P Kingma, Tim Salimans, Rafal Jozefowicz, Xi Chen, Ilya Sutskever, and Max Welling. Improved variational inference with inverse autoregressive flow. In Advances in neural information processing systems, pages 4743-4751, 2016.

[32] Ivan Kobyzev, Simon Prince, and Marcus A Brubaker. Normalizing flows: Introduction and ideas. arXiv preprint arXiv:1908.09257, 2019.

[33] Manoj Kumar, Mohammad Babaeizadeh, Dumitru Erhan, Chelsea Finn, Sergey Levine, Laurent Dinh, and Durk Kingma. Videoflow: A conditional flow-based model for stochastic video generation. arXiv preprint arXiv:1903.01434, 2019.

[34] A. M. Lehrmann, P. Gehler, and S. Nowozin. Efficient nonlinear markov models for human motion. In CVPR, 2014.

[35] Jean-Francois Le Gall. Brownian motion, martingales, and stochastic calculus, volume 274. Springer, 2016.

[36] Xuechen Li, Ting-Kam Leonard Wong, Ricky TQ Chen, and David Duvenaud. Scalable gradients for stochastic differential equations. arXiv preprint arXiv:2001.01328, 2020.

[37] Rui Luo, Weinan Zhang, Xiaojun Xu, and Jun Wang. A neural stochastic volatility model. In Thirty-Second AAAI Conference on Artificial Intelligence, 2018.

[38] Nazanin Mehrasa, Ruizhi Deng, Mohamed Osama Ahmed, Bo Chang, Jiawei He, Thibaut Durand, Marcus Brubaker, and Greg Mori. Point process flows. arXiv preprint arXiv:1910.08281, 2019.

[39] George Papamakarios, Eric Nalisnick, Danilo Jimenez Rezende, Shakir Mohamed, and Balaji Lakshminarayanan. Normalizing flows for probabilistic modeling and inference. arXiv preprint arXiv:1912.02762, 2019.

[40] George Papamakarios, Theo Pavlakou, and Iain Murray. Masked autoregressive flow for density estimation. In Advances in Neural Information Processing Systems, pages 2338-2347, 2017.

[41] Shenghao Qin, Jiacheng Zhu, Jimmy Qin, Wenshuo Wang, and Ding Zhao. Recurrent attentive neural process for sequential data. arXiv preprint arXiv:1910.09323, 2019.

[42] C. E. Rasmussen. Gaussian Processes for Machine Learning. MIT Press, 2006.

[43] Danilo Rezende and Shakir Mohamed. Variational inference with normalizing flows. In International Conference on Machine Learning, pages 1530-1538, 2015.

[44] Yulia Rubanova, Tian Qi Chen, and David K Duvenaud. Latent ordinary differential equations for irregularly-sampled time series. In Advances in Neural Information Processing Systems, pages 5321-5331, 2019.

[45] Simo SÃ¤rkkÃ¤.. On unscented kalman filtering for state estimation of continuous-time nonlinear systems. In IEEE Trans. on Automatic Control, 2007.

[46] Oleksandr Shchur, Marin Biloš, and Stephan Gunnemann. Intensity-free learning of temporal point processes. International Conference on Learning Representations (ICLR), 2020.

[47] Gautam Singh, Jaesik Yoon, Youngsung Son, and Sungjin Ahn. Sequential neural processes. In Advances in Neural Information Processing Systems, pages 10254-10264, 2019.

[48] Yuval Tassa, Yotam Doron, Alistair Muldal, Tom Erez, Yazhe Li, Diego de Las Casas, David Budden, Abbas Abdolmaleki, Josh Merel, Andrew Lefrancq, Timothy Lillicrap, and Martin Riedmiller. DeepMind control suite. Technical report, DeepMind, January 2018.

[49] Shuyi Zhang, Bin Guo, Anlan Dong, Jing He, Ziping Xu, and Song Xi Chen. Cautionary tales on air-quality improvement in beijing. Proceedings of the Royal Society A: Mathematical, Physical and Engineering Sciences, 473(2205):20170457, 2017.

What is claimed is:

1. A system for a machine learning architecture for time series data prediction comprising:

a processor; and a memory coupled to the processor and storing processor-executable instructions that, when executed, configure the processor to:

obtain time series data associated with a data query;

generate a predicted value by executing a machine learning application based on a sampled realization of the time series data, the machine learning application comprising a continuous time generative model trained to define an invertible mapping to maximize a log-likelihood of a set of predicted values for a time range associated with the time series data, wherein generation of the predicted value comprises:

computing the predicted value based on a joint distribution $X_\tau = F_\theta(W_\tau; \tau)$, $\forall \tau \in [0, T]$, where $F_\theta(\cdot; \tau): \mathbb{R}^d \to \mathbb{R}^d$ is the invertible mapping parametrized by the learnable parameters $\theta$ for every $\tau \in [0, T]$, and $W_\tau$ is a d-dimensional Wiener process, such that the log-likelihood $$\mathcal{L} = \log p_{x_{\tau_1}, \ldots, x_{\tau_n}}(x_{\tau_1}, \ldots, x_{\tau_n})$$

is maximized, where $p_X(x)$ represents a probability density function of x;

wherein the invertible mapping is based on solving an initial value problem defined by:

$$\frac{d}{dt}\begin{pmatrix} h_\tau(t) \\ a_\tau(t) \end{pmatrix} = \begin{pmatrix} f_\theta(h_\tau(t), a_\tau(t), t) \\ g_\theta(a_\tau(t), t) \end{pmatrix}, \begin{pmatrix} h_\tau(t_0) \\ a_\tau(t_0) \end{pmatrix} = \begin{pmatrix} w_\tau \\ \tau \end{pmatrix},$$

where $h_\tau(t) \in \mathbb{R}^d$, $t \in [t_0, t_1]$, $f_\theta: \mathbb{R}^d \times \mathbb{R} \times [t_0, t_1] \to \mathbb{R}^d$, and $g_\theta: \mathbb{R} \times [t_o, t_1] \to \mathbb{R}$, and the joint distribution $F_\theta(w_\tau; \tau)$ is defined as a solution of $h_\tau(t)$; and generate a signal providing an indication of the predicted value associated with the data query for performing a downstream task.

2. The system of claim 1, wherein the invertible mapping is parameterized by a latent variable having an isotropic Gaussian prior distribution.

3. The system of claim 1, wherein the predicted value represents one or more observed process data points based on a sampled realization of a Weiner process and the invertible mapping to provide a time continuous observed realization of the Weiner process.

4. The system of claim 3, wherein the obtained time series data includes an incomplete realization of a continuous stochastic process.

5. The system of claim 4, wherein: the joint distribution is defined as the solution of $h_\tau(t)$ at $$F_\theta(w_\tau; \tau) := h_\tau(t_1) = h_\tau(t_0) + \int_{t_0}^{t_1} f_\theta(h_\tau(t), a_\tau(t), t)dt.$$

6. The system of claim 1, wherein the processor-executable instructions, when executed, configure the processor to:

obtain a training dataset including irregular time series data over time associated with an incomplete realization of a continuous stochastic process; and generate the invertible mapping associated with the continuous time generative model based on maximizing the log-likelihood of the set of predicted values.

7. The system of claim 1, wherein the obtained time series data includes observed process data points, wherein the predicted value represents a likelihood determination of stochastic process data points based on the observed process data points and an inverse of the invertible mapping of the continuous time generative model.

8. The system of claim 1, wherein the obtained time series data includes unobserved process data points, and wherein the predicted value represents a conditional probability density of stochastic data points based on the unobserved process data points and an inverse of the invertible mapping of the continuous time generative model.

9. The system of claim 8, wherein the conditional probability density provides for data point interpolation associated with a stochastic process based on a Brownian bridge.

10. The system of claim 8, wherein the conditional probability density provides for data point extrapolation of data points associated with a stochastic process based on a multivariate Gaussian conditional probability distribution.

11. The system of claim 1, wherein the continuous time generative model is based on an augmented neural ordinary differential equation (ANODE) including a multi-layer perceptron (MLP model) having at least 4 hidden layers.

12. A method for a machine learning architecture for time series data prediction comprising:

obtaining time series data associated with a data query;

generating a predicted value by executing a machine learning application based on a sampled realization of the time series data, the machine learning application comprising a continuous time generative model trained to define an invertible mapping to maximize a log-likelihood of a set of predicted values for a time range associated with the time series data, wherein generation of the predicted value comprises:

computing the predicted value based on a joint distribution $X_\tau = F_\theta(W_\tau; \tau)$, $\forall \tau \in [0, T]$, where $F_\theta(\bullet; \tau): \mathbb{R}^d \to \mathbb{R}^d$ is the invertible mapping parametrized by the learnable parameters $\theta$ for every $\tau \in [0, T]$, and $W_\tau$ is a d-dimensional Wiener process, such that the log-likelihood $$\mathcal{L} = \log p_{x_{\tau_1}, \ldots, x_{\tau_n}}(x_{\tau_1}, \ldots, x_{\tau_n})$$

is maximized, where $p_X(x)$ represents a probability density function of x;

wherein the invertible mapping is based on solving an initial value problem defined by:

$$\frac{d}{dt}\begin{pmatrix} h_\tau(t) \\ a_\tau(t) \end{pmatrix} = \begin{pmatrix} f_\theta(h_\tau(t), a_\tau(t), t) \\ g_\theta(a_\tau(t), t) \end{pmatrix}, \begin{pmatrix} h_\tau(t_0) \\ a_\tau(t_0) \end{pmatrix} = \begin{pmatrix} w_\tau \\ \tau \end{pmatrix},$$

where $h_\tau(t) \in \mathbb{R}^d$, $t \in [t_0, t_1]$, $f_\theta: \mathbb{R}^d \times \mathbb{R} \times [t_0, t_1] \to \mathbb{R}^d$, and $g_\theta: \mathbb{R} \times [t_0, t_1] \to \mathbb{R}$, and the joint distribution $F_\theta(w_\tau; \tau)$ is defined as a solution of $h_\tau(t)$, and generating a signal providing an indication of the predicted value associated with the data query for performing a downstream task.

13. The method of claim 12, wherein the invertible mapping is parameterized by a latent variable having an isotropic Gaussian prior distribution.

14. The method of claim 12, wherein the predicted value represents one or more observed process data points based on a sampled realization of a Weiner process and the invertible mapping to provide a time continuous observed realization of the Weiner process.

15. The method of claim 14, wherein the obtained time series data includes an incomplete realization of a continuous stochastic process.

16. The method of claim 15, wherein: the joint distribution is defined as the solution of $h_\tau(t)$ at $$t = t_1 : F_\theta(w_\tau; \tau) := h_\tau(t_1) = h_\tau(t_0) + \int_{t_0}^{t_1} f_\theta(h_\tau(t), a_\tau(t), t) dt.$$

17. The method of claim 12, comprising:

obtaining a training dataset including irregular time series data over time associated with an incomplete realization of a continuous stochastic process; and generating the invertible mapping associated with the continuous time generative model based on maximizing the log-likelihood of the set of predicted values.

18. The method of claim 12, wherein the obtained time series data includes observed process data points, wherein the predicted value represents a likelihood determination of stochastic process data points based on the observed process data points and an inverse of the invertible mapping of the continuous time generative model.

19. The method of claim 12, wherein the obtained time series data includes unobserved process data points, and wherein the predicted value represents a conditional probability density of stochastic data points based on the unobserved process data points and an inverse of the invertible mapping of the continuous time generative model.

20. A non-transitory computer-readable medium having stored thereon machine interpretable instructions which, when executed by a processor, cause the processor to perform a method for a machine learning architecture for time series data prediction, the method comprising:

obtaining time series data associated with a data query;

generating a predicted value by executing a machine learning application based on a sampled realization of the time series data, the machine learning application comprising a continuous time generative model trained to define an invertible mapping to maximize a log-likelihood of a set of predicted values for a time range associated with the time series data, wherein generation of the predicted value comprises;

computing the predicted value based on a joint distribution $X_\tau = F_\theta(W_\tau; \tau)$, $\forall \tau \in [0, T]$, where $F_\theta(\omega; \tau): \mathbb{R}^d \to \mathbb{R}^d$ is the invertible mapping parametrized by the learnable parameters $\theta$ for every $\tau \in [0, T]$, and $W_\tau$ is a d-dimensional Wiener process, such that the log-likelihood $$\mathcal{L} = \log p_{x_{\tau_1}, \ldots, x_{\tau_n}}(x_{\tau_1}, \ldots, x_{\tau_n})$$

is maximized, where $p_X(x)$ represents a probability density function of x;

wherein the invertible mapping is based on solving an initial value problem defined by:

$$\frac{d}{dt}\begin{pmatrix} h_\tau(t) \\ a_\tau(t) \end{pmatrix} = \begin{pmatrix} f_\theta(h_\tau(t), a_\tau(t), t) \\ g_\theta(a_\tau(t), t) \end{pmatrix}, \begin{pmatrix} h_\tau(t_0) \\ a_\tau(t_0) \end{pmatrix} = \begin{pmatrix} w_\tau \\ \tau \end{pmatrix},$$

where $h_\tau(t) \in \mathbb{R}^d$, $t \in [t_0, t_1]$, $f_\theta: \mathbb{R}^d \times R \times [t_0, t_1] \to \mathbb{R}^d$, and $g_\theta: \mathbb{R} \times [t_0, t_1] \to \mathbb{R}$, and the joint distribution $F_\theta(w_\tau; \tau)$ is defined as a solution of $h_\tau(t)$; and generating a signal providing an indication of the predicted value associated with the data query for performing a downstream task.

\* \* \* \* \*